(12) United States Patent
Mishra et al.

(10) Patent No.: US 11,106,746 B2
(45) Date of Patent: Aug. 31, 2021

(54) DETERMINING SENTIMENT OF CONTENT AND SELECTING CONTENT ITEMS FOR TRANSMISSION TO DEVICES

(71) Applicant: Oath Inc., New York, NY (US)

(72) Inventors: Shaunak Mishra, Jersey City, NJ (US); Aasish Kumar Pappu, Jersey City, NJ (US); Lakshmi Narayan Bhamidipati, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 243 days.

(21) Appl. No.: 16/360,140

(22) Filed: Mar. 21, 2019

(65) Prior Publication Data

US 2020/0301983 A1 Sep. 24, 2020

(51) Int. Cl.
*G06F 16/9535* (2019.01)
*G06F 40/30* (2020.01)

(52) U.S. Cl.
CPC .......... *G06F 16/9535* (2019.01); *G06F 40/30* (2020.01)

(58) Field of Classification Search
CPC .............................. G06F 16/9535; G06F 40/30
USPC ......................................................... 707/734
See application file for complete search history.

(56) References Cited

U.S. PATENT DOCUMENTS

| | | | |
|---|---|---|---|
| 8,306,977 B1 * | 11/2012 | Gildfind | G06F 16/3322 707/734 |
| 8,650,143 B2 * | 2/2014 | Fano | G06N 5/02 706/46 |
| 8,838,438 B2 * | 9/2014 | Leary | G06F 40/253 704/9 |
| 8,977,948 B1 * | 3/2015 | Balfe | G06F 16/337 715/206 |
| 9,129,008 B1 * | 9/2015 | Kuznetsov | G06F 16/313 |
| 9,134,215 B1 * | 9/2015 | Vignisson | G06F 40/30 |
| 9,282,161 B1 * | 3/2016 | Hill | H04L 67/18 |
| 9,317,559 B1 * | 4/2016 | Blair-Goldensohn | G06F 16/951 |
| 9,449,080 B1 * | 9/2016 | Zhang | G06F 16/3331 |

(Continued)

OTHER PUBLICATIONS

Fang et al., "Sentiment Analysis Using Product Review Data," Journal of Big Data (2015) 2:5, 14 pages, https://doi.org/10.1186/s40537-015-0015-2. (Year: 2015).*

(Continued)

*Primary Examiner* — Phuong Thao Cao
(74) *Attorney, Agent, or Firm* — Cooper Legal Group, LLC

(57) ABSTRACT

One or more computing devices, systems, and/or methods are provided. An informational database may be analyzed based upon an entity to identify an informational article. The informational article may be analyzed to identify one or more first references associated with a first sentiment category and/or one or more second references associated with a second sentiment category. Sentiment tags, indicative of sentiment categories, may be assigned to one or more first reference content items associated with the one or more first references and/or to one or more second reference content items associated with the one or more second references. For each content item of a plurality of content items associated with the entity, a sentiment category associated with the content item may be determined based upon a comparison of the content item with the one or more first reference content items and the one or more second reference content items.

20 Claims, 13 Drawing Sheets

(56) References Cited

U.S. PATENT DOCUMENTS

| | | | | |
|---|---|---|---|---|
| 9,495,425 | B1* | 11/2016 | Kuznetsov | G06F 16/248 |
| 9,659,084 | B1* | 5/2017 | Zhang | G06F 16/338 |
| 9,697,196 | B2* | 7/2017 | Zhang | G06F 40/30 |
| 10,528,866 | B1* | 1/2020 | Dai | G06N 3/0445 |
| 2009/0193011 | A1* | 7/2009 | Blair-Goldensohn | G06F 16/345 |
| 2010/0262454 | A1* | 10/2010 | Sommer | G06Q 30/02 706/20 |
| 2012/0278064 | A1* | 11/2012 | Leary | G06F 40/253 704/9 |
| 2012/0317198 | A1* | 12/2012 | Patton | G06F 16/9537 709/204 |
| 2013/0018894 | A1* | 1/2013 | Qiao | G06F 16/345 707/748 |
| 2013/0110823 | A1* | 5/2013 | Su | G06F 16/9535 707/723 |
| 2013/0110928 | A1* | 5/2013 | Ghosh | G06Q 50/01 709/204 |
| 2013/0198204 | A1* | 8/2013 | Williams | G06F 16/951 707/748 |
| 2013/0218905 | A1* | 8/2013 | Sankarasubramaniam | H04N 21/4661 707/748 |
| 2013/0275547 | A1* | 10/2013 | Chew | H04L 61/2514 709/217 |
| 2013/0290905 | A1* | 10/2013 | LuVogt | G06N 3/006 715/835 |
| 2014/0279793 | A1* | 9/2014 | Wohlstadter | G06N 5/04 706/46 |
| 2014/0372226 | A1* | 12/2014 | Pavley | G06Q 30/0269 705/14.66 |
| 2015/0046371 | A1* | 2/2015 | Leary | G06F 40/253 705/347 |
| 2015/0052115 | A1* | 2/2015 | Sharifi | G06F 16/24578 707/722 |
| 2015/0066950 | A1* | 3/2015 | Tobe | G06F 16/51 707/748 |
| 2015/0142520 | A1* | 5/2015 | Bala | G06Q 30/0203 705/7.32 |
| 2015/0248424 | A1* | 9/2015 | Berube | G06F 16/93 715/234 |
| 2015/0370902 | A1* | 12/2015 | Oztaskent | G06F 16/335 707/770 |
| 2015/0379527 | A1* | 12/2015 | Skiba | G06Q 50/01 705/7.29 |
| 2016/0188604 | A1* | 6/2016 | Lange | G06F 16/9535 705/14.53 |
| 2016/0350664 | A1* | 12/2016 | Devarajan | G06Q 50/01 |
| 2016/0360466 | A1* | 12/2016 | Barak | H04W 40/02 |
| 2017/0039196 | A1* | 2/2017 | Banerjee | G06F 16/9535 |
| 2017/0076225 | A1* | 3/2017 | Zhang | G06N 20/00 |
| 2017/0351653 | A1* | 12/2017 | Ramlet | G06F 40/58 |
| 2018/0004718 | A1* | 1/2018 | Pappu | G06F 40/35 |
| 2018/0035254 | A1* | 2/2018 | Zhang | H04L 67/306 |
| 2018/0082389 | A1* | 3/2018 | Guggilla | G06N 5/022 |
| 2019/0026786 | A1* | 1/2019 | Khoury | G06Q 30/0271 |
| 2019/0073411 | A1* | 3/2019 | Booker | G06F 16/287 |
| 2019/0164170 | A1* | 5/2019 | Kataria | G06Q 10/105 |
| 2019/0164196 | A1* | 5/2019 | Tang | G06N 5/02 |
| 2020/0026769 | A1* | 1/2020 | Tripodi | G06F 16/438 |
| 2020/0065383 | A1* | 2/2020 | Hadi | G06F 40/30 |
| 2020/0065425 | A1* | 2/2020 | Menguy | G06Q 30/0631 |
| 2020/0090233 | A1* | 3/2020 | D'Alfonso | G06F 16/24578 |
| 2020/0159754 | A1* | 5/2020 | Mutalikdesai | G06N 5/02 |
| 2020/0218781 | A1* | 7/2020 | Takano | G06Q 30/016 |

OTHER PUBLICATIONS

Faralli et al., "Semantic Enabled Recommender System for Microblog Users," 2016 IEEE 16th International Conference on Data Mining Workshops, 2016, pp. 992-998. (Year: 2016).*

Gurini et al., "A Sentiment-Based Approach to Twitter User Recommendation," in Proceedings of 5th ACM RecSys Workshop on Recommender Systems and Social Web, Jun. 2013, 4 pages. (Year: 2013).*

Lei et al., "Rating Prediction Based on Social Sentiment From Textual Reviews," IEEE Transactions on Multimedia, vol. 18, No. 9, Sep. 2016, pp. 1910-1921. (Year: 2016).*

Pak et al., "Twitter as a Corpus for Sentiment Analysis and Opinion Mining," in Proceedings of Language Resource and Evaluation Conference, 2010, pp. 1320-1326. (Year: 2010).*

* cited by examiner

DETERMINING SENTIMENT OF CONTENT AND SELECTING CONTENT ITEMS FOR TRANSMISSION TO DEVICES

BACKGROUND

Many services, such as websites, applications, etc. may provide platforms for viewing media. For example, a user may interact with a service, where the service may use user information associated with the user to determine interests of the user. For example, media may be selected for the user based upon the interests of the user.

SUMMARY

In accordance with the present disclosure, one or more computing devices and/or methods are provided. In an example, an informational database may be analyzed based upon a first entity to identify a first informational article associated with the first entity from a plurality of informational articles of the informational database. The first informational article may be analyzed to identify one or more first references associated with a first sentiment category and/or one or more second references associated with a second sentiment category. One or more first sentiment tags, indicative of the first sentiment category, may be assigned to one or more first reference content items associated with the one or more first references. One or more second sentiment tags, indicative of the second sentiment category, may be assigned to one or more second reference content items associated with the one or more second references. A plurality of content items associated with the first entity may be identified. For each content item of the plurality of content items, a content item sentiment category associated with the content item may be determined based upon a comparison of the content item with the one or more first reference content items and the one or more second reference content items and/or a sentiment tag corresponding to the content item sentiment category, may be assigned to the content item. A request for content associated with a client device may be received. A user profile associated with the client device may be analyzed to identify one or more first content items comprising one or more content items of the one or more first reference content items associated with the first sentiment category, one or more content items of the one or more second reference content items associated with the second sentiment category and/or one or more content items of the plurality of content items. One or more sentiment tags associated with the one or more first content items may be identified. A user sentiment score associated with the first entity may be generated based upon the one or more sentiment tags. A transmission content item may be selected for transmission to the client device based upon the user sentiment score.

In an example, an informational database may be analyzed based upon a first entity to identify a first informational article associated with the first entity from a plurality of informational articles of the informational database. The first informational article may be analyzed to identify one or more first references associated with a first sentiment category and/or one or more second references associated with a second sentiment category. One or more first sentiment tags, indicative of the first sentiment category, may be assigned to one or more first reference content items associated with the one or more first references. One or more second sentiment tags, indicative of the second sentiment category, may be assigned to one or more second reference content items associated with the one or more second references. A plurality of content items associated with the first entity may be identified. For each content item of the plurality of content items, a content item sentiment category associated with the content item may be determined based upon a comparison of the content item with the one or more first reference content items and the one or more second reference content items and/or a sentiment tag corresponding to the content item sentiment category, may be assigned to the content item.

In an example, a request for content associated with a client device may be received. A user profile associated with the client device may be analyzed to identify one or more first content items associated with a first entity. One or more sentiment tags associated with the one or more first content items and the first entity may be identified. A user sentiment score associated with the first entity may be generated based upon the one or more sentiment tags. A transmission content item may be selected for transmission to the client device based upon the user sentiment score.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
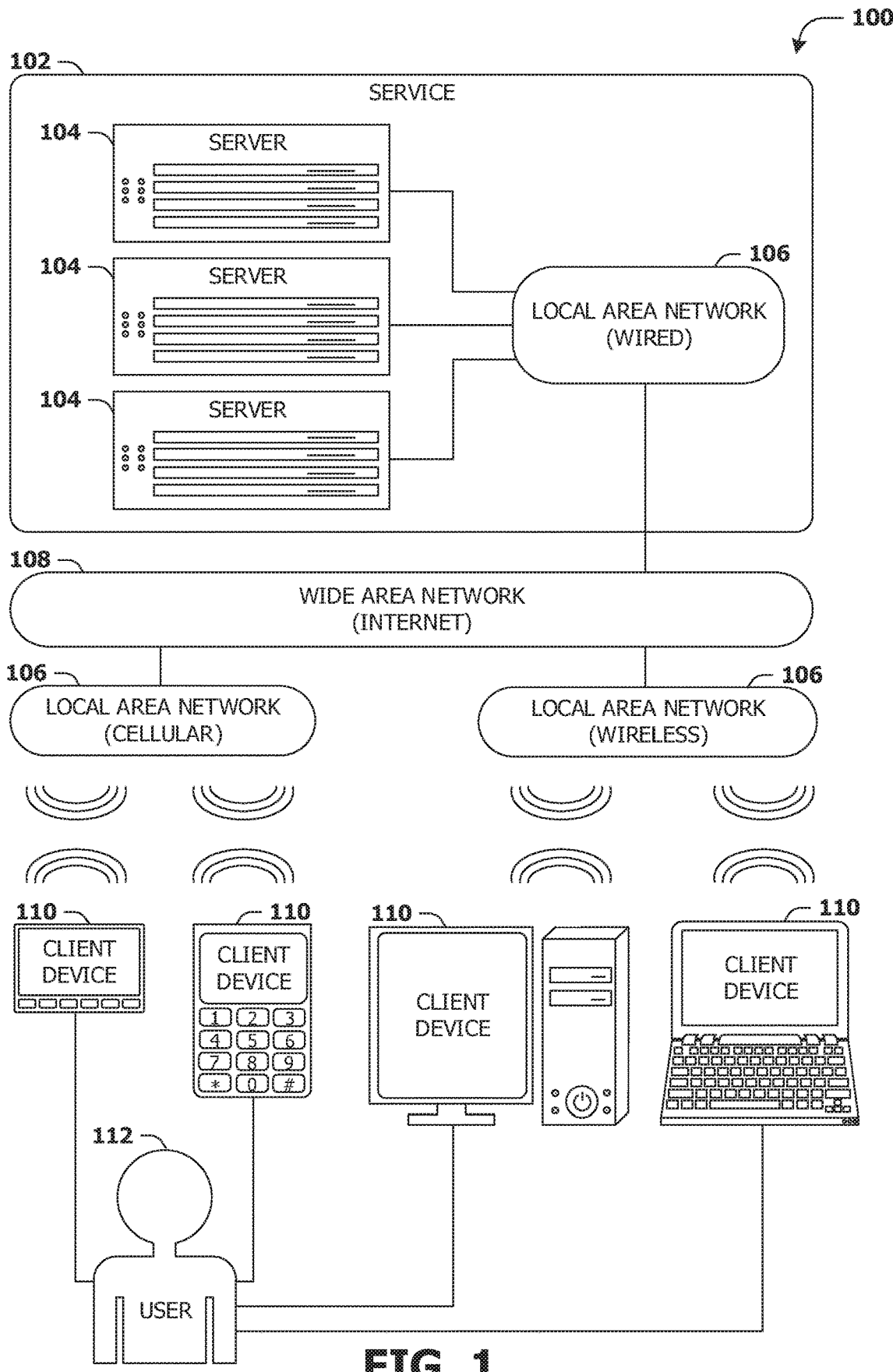
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
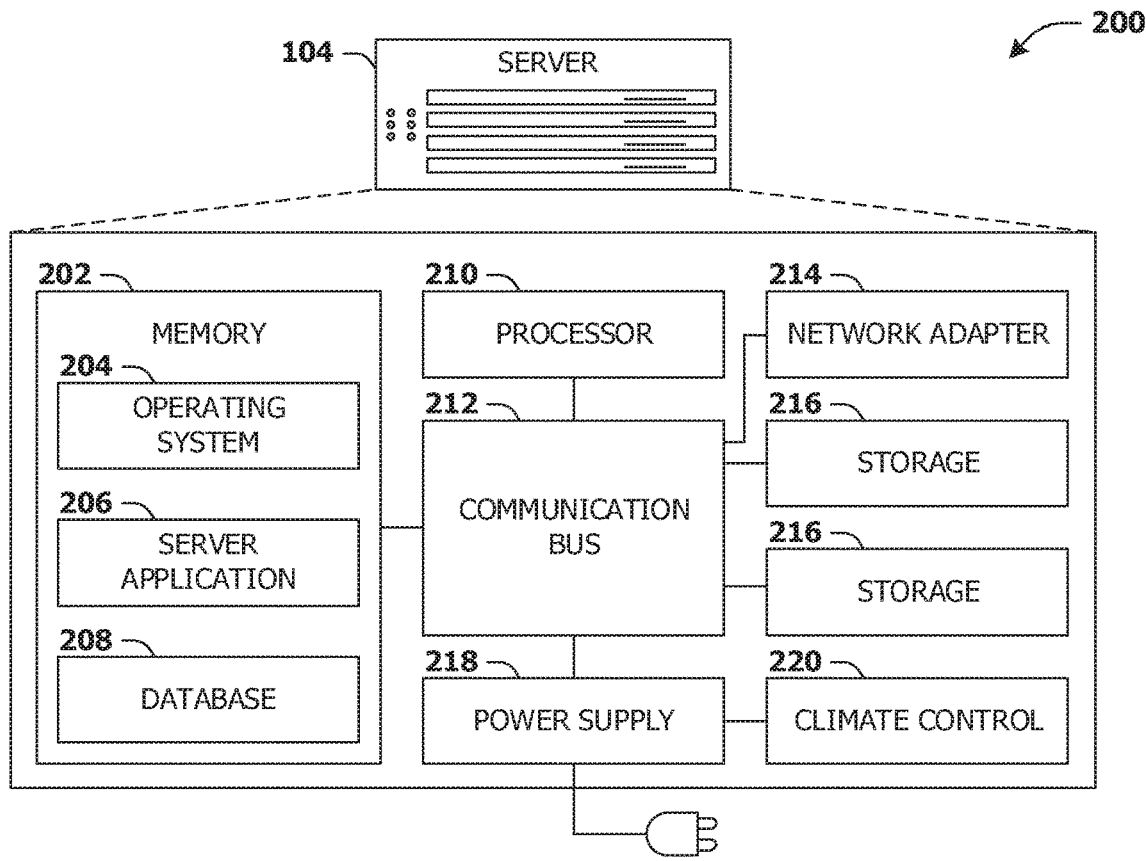
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system.

The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
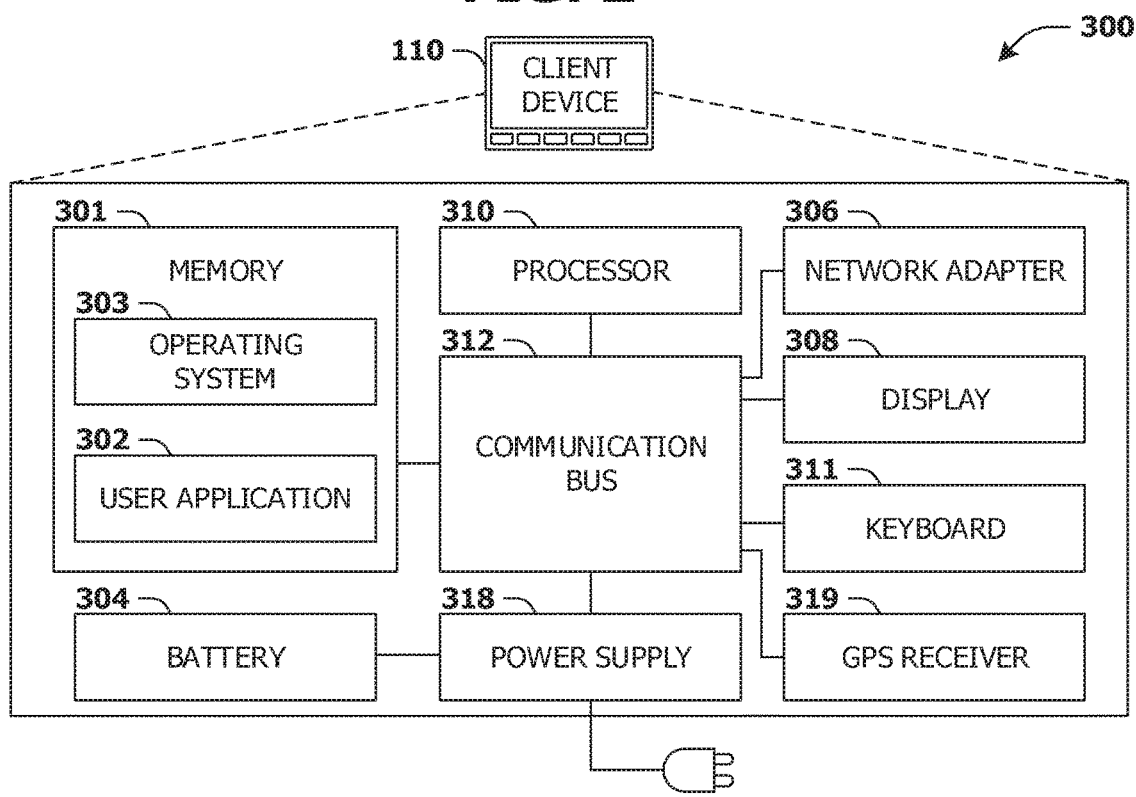
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining a sentiment category of a content item with respect to an entity and/or for selecting content for transmission to devices are provided. For example, a user (and/or a device associated with the user) may access and/or interact with a service, such as a browser, software, a website, an application, an operating system, etc. that provides a platform for viewing and/or downloading content from a server associated with a content system. In some examples, the content system may use user information, such as activity information (e.g., search history information, website browsing history, email information, etc.), user demographic information, location information, etc. to determine interests of the user. For example, the user information may be received from the device (and/or one or more other devices associated with the user and/or a user account associated with the user). Alternatively and/or additionally, the user information may be received from servers associated with websites visited by the user, servers associated with an email account of the user, etc.

For example, it may be determined (by the content system) that the user consumed content items associated with a first entity. The content items may correspond to articles (e.g., news articles, educational articles, etc.), videos (e.g., educational videos, entertainment videos, etc.), audio files (e.g., news-related audio segments, podcasts, etc.), emails from an organization and/or a company (e.g., subscription-based emails), etc. A first content item, associated with the first entity, may be selected for the user (e.g., selected for transmission to the device associated with the user) based upon the content items. However, the content system may not take one or more sentiment categories associated with the one or more content items into account when selecting the first content item. A sentiment category associated with a content item of the one or more content items may correspond to whether a portrayal of the first entity by the content item is negative, positive and/or neutral (and/or a different sentiment).

Alternatively and/or additionally, the content system may not take a first user sentiment score into account when selecting the first content item for the user. For example, the first user sentiment score may be indicative of the user being exposed to more negative content associated with the first entity than positive content associated with the first entity. However, the first content item may be associated with a user sentiment score that is different than the first sentiment score (e.g., the user may not be interested in the first content item as a result of the user being exposed to more negative content associated with the first entity than positive content associated with the first entity).

Thus, in accordance with one or more of the techniques presented herein, sentiment categories associated with content items may be determined. Sentiment tags may be assigned to the content items based upon the determined sentiment categories. A user profile associated with a client device and/or a user account may be analyzed to identify sentiment tags corresponding to content items (previously) consumed and/or accessed. A sentiment score associated with the user profile may be determined based upon the sentiment tags and/or content may be selected for transmission to the client device based upon the sentiment score.

A sentiment of a content item may correspond to subjective information, such as opinions, feelings, thoughts, facts, judgments and/or assessments towards (and/or about) an entity that are expressed by the content item. Alternatively and/or additionally the sentiment of the content item may correspond to opinions, feelings, thoughts, judgments and/or assessments, that a user who consumed the content item may have towards (and/or about) the entity. Alternatively and/or additionally, the sentiment of the content item may correspond to a sentiment category. The sentiment category may be indicative of an intensity of opinions, feelings, thoughts, judgments and/or assessments towards (and/or about) the entity. For example, the sentiment category may be indicative of a level of positivity of the content item towards (and/or about) the entity (e.g., a level of favorability of feelings, thoughts, judgments and/or assessments associated with the content item and/or a user who consumed the content item towards the entity) and/or a level of negativity of the content item towards (and/or about) the entity (e.g., a level unfavorability of feelings, thoughts, judgments and/or assessments associated with the content item and/or a user who consumed the content item towards the entity).

In an example, a first positive sentiment category may be indicative of a first level of positivity (and/or a first range of levels of positivity), a second positive sentiment category may be indicative of a second level of positivity (and/or a second range of levels of positivity), etc. Alternatively and/or additionally, a first negative sentiment category may be indicative of a first level of negativity (and/or a first range of levels of negativity), a second negative sentiment category may be indicative of a second level of negativity (and/or a second range of levels of negativity), etc.

Alternatively and/or additionally, the sentiment category may be indicative of a polarity of opinions, feelings, thoughts, judgements and/or assessments towards (and/or about) the entity. For example, a first sentiment category may be indicative of the content item expressing negative (and/or unfavorable) opinions, feelings, thoughts, facts, judgements and/or assessments about the entity and/or a user who consumed the content item having negative opinions, feelings, thoughts, judgments and/or assessments towards the entity based upon the content item. Alternatively and/or additionally, a second sentiment category may be indicative of the content item expressing positive (and/or neutral) opinions, feelings, thoughts, facts, judgements and/or assessments about the entity and/or a user who consumed the content item having positive opinions, feelings, thoughts, judgments and/or assessments towards the entity based upon the content item.

In an example, a first content item may be a first news article describing that a company is expanding to various locations, that a stock value of the company is increasing and/or exceeding expectations, etc. It may be determined that the first content item is associated with the second sentiment category. For example, it may be determined that the first content item is associated with the second sentiment category based upon a determination that the first content item expresses positive (and/or neutral) opinions, feelings, thoughts, facts, judgements and/or assessments about the company. Alternatively and/or additionally, it may be determined that the first content item is associated with the second sentiment category based upon a determination that a user who consumes the first content item may have positive opinions, feelings, thoughts, judgments and/or assessments towards the company based upon the first content item.

In another example, a second content item may be a second news article describing that various stores of a second company are being closed, that a stock value of the second company is decreasing and/or not meeting expectations, that there are a number of lawsuits against the second company, etc. It may be determined that the second content item is associated with the first sentiment category. For example, it may be determined that the second content item is associated with the first sentiment category based upon a determination that the second content item expresses negative opinions, feelings, thoughts, facts, judgements and/or assessments about the second company. Alternatively and/or additionally, it may be determined that the second content item is associated with the first sentiment category based upon a determination that a user who consumes the second content item may have negative opinions, feelings, thoughts, judgments and/or assessments towards the second company based upon the second content item.

Figure 4A:
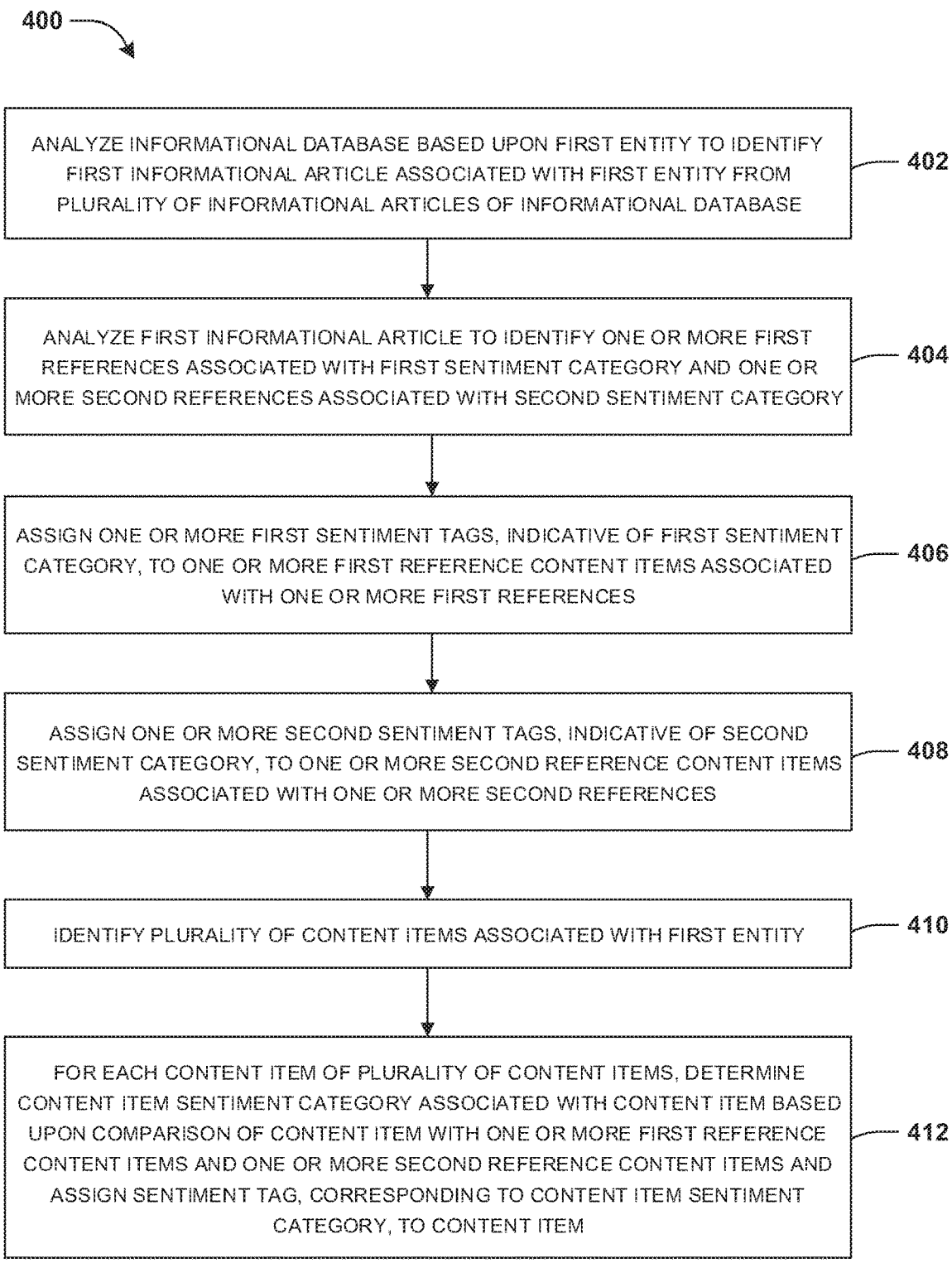
FIG. 4A is a flow chart illustrating a first portion of an example method for determining a sentiment category of a content item with respect to an entity and/or for selecting content for transmission to devices.
Figure 4B:
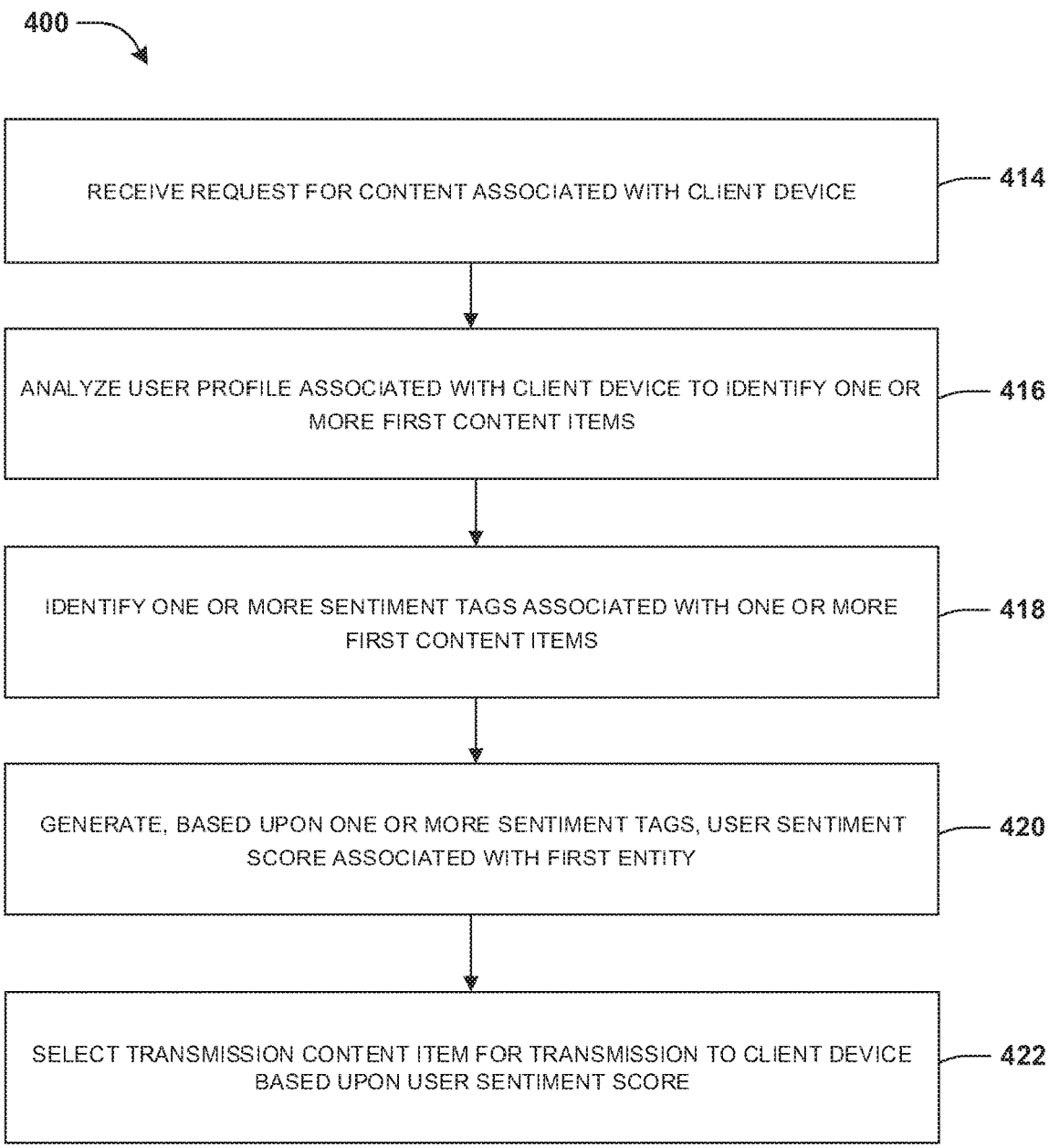
FIG. 4B is a flow chart illustrating a second portion of an example method for determining a sentiment category of a content item with respect to an entity and/or for selecting content for transmission to devices.

An embodiment of determining a sentiment category of a content item with respect to an entity and/or for selecting content for transmission to devices is illustrated by an example method 400 of FIGS. 4A-4B. A content system for presenting content via client devices may be provided. In some examples, the content system may be an advertisement system. Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, the content system may provide content items for presentation via client devices based upon (past) user activity associated with the client devices. For examples, the content system may generate and/or maintain a user profile database comprising a plurality of user profiles associated with a plurality of client devices and/or a plurality of user accounts (e.g., email accounts, content platform accounts, etc.) associated with the content system. Each user profile of the plurality of user profiles may be indicative of one or more of one or more consumed content items (e.g., an article, a video, an audio file, an image, a webpage, an advertisement, an email, a message, etc. consumed by a user), one or more accessed content items (e.g., an article, a video, an audio file, an image, a webpage, an advertisement, an email, a message, etc. accessed by a client device), one or more selected content items (e.g., an article, a video, an audio file, an image, a webpage, an advertisement, an email, a message, etc. selected via a client device), etc. However, in order to select content for transmission to a client device, it may be beneficial to determine one or more sentiment categories associated with one or more content items comprised within (and/or indicated by) a user profile associated with the client device.

In some examples, a first entity may access and/or interact with a service, such as an advertising service, that provides a platform for uploading content to be presented via client devices to the content system. The user profile database may comprise (indications of) a plurality of content items associated with the first entity. The plurality of content items may correspond to one or more of articles (e.g., news articles, educational articles, etc.), videos (e.g., educational videos, entertainment videos, etc.), audio files (e.g., news-related audio segments, podcasts, etc.), emails from an organization and/or a company (e.g., subscription-based emails), etc.

At 402, an informational database may be analyzed based upon the first entity to identify a first information article associated with the first entity from a plurality of informational articles of the informational database. In some examples, the informational database may be associated with a web encyclopedia (e.g., a web-based encyclopedia). In some examples, informational articles of the plurality of informational articles may be edited by editors associated with the informational database (e.g., information and/or content may be added to informational articles of the plurality of informational articles, information and/or content may be removed from informational articles of the plurality of informational articles, etc.). Alternatively and/or additionally, the informational database may be based upon a model of openly editable content where informational articles of the plurality of informational articles may be edited by one or more of users, computers (e.g., bots), etc. via editing processes associated with the informational database (in accordance with rules and/or guidelines associated with the informational database).

In some examples, the first informational article may be identified by analyzing the informational database based upon a name of the first entity. For example, a title and/or a header of the first informational article may match the name of the first entity (e.g., the title of the first informational article may comprise letters and/or words that are also in the name of the first entity). For example, the first informational article may be accessed via the informational database and/or downloaded for analysis.

At 404, the first informational article may be analyzed to identify one or more first references associated with a first sentiment category and/or one or more second references associated with a second category. In some examples, the one or more first references may be cited throughout one or more sections of the first informational article (e.g., one reference may be cited after a first sentence and/or quote, while another reference may be cited after a second sentence and/or quote, etc.), and/or may be listed at the end and/or bottom of the first informational article. The first sentiment category may be indicative of a content item associated with a reference expressing negative (and/or unfavorable) opinions, feelings, thoughts, facts, judgements and/or assessments about the first entity and/or a user who consumed the content item having negative opinions, feelings, thoughts, judgments and/or assessments towards the first entity based upon the content item. Alternatively and/or additionally, a second sentiment category may be indicative of a content item associated with a reference expressing positive (e.g., favorable) (and/or neutral) opinions, feelings, thoughts, facts, judgements and/or assessments about the first entity and/or a user who consumed the content item having positive (and/or neutral) opinions, feelings, thoughts, judgments and/or assessments towards the first entity based upon the content item.

In some examples, one or more first sections, within the first informational article, associated with the first sentiment category may be identified. Each section of the one or more first sections may comprise one or more words, one or more sentences and/or one or more paragraphs. In some examples, it may be determined that the one or more first sections are associated with the first sentiment category based upon a determination that one or more first headers associated with the one or more first sections are associated with the first sentiment category. Alternatively and/or additionally, each section of the one or more first sections may be preceded by (and/or adjacent to) a header (e.g., a title, a sub-header, etc.) of the one or more first headers (e.g., each section of the one or more first sections may be identified based upon a positioning of the section between two headers of the first informational article).

In some examples, each header of the one or more first headers may be determined to be associated with the first sentiment category based upon a determination that each header of the one or more first headers matches a header in a first list of headers associated with the first sentiment category. For example, the first list of headers may comprise words and/or phrases associated with the first sentiment category (e.g., controversy, criticism, decline, dispute, sexism, bias, criticism and controversy, theft, allegations, etc.). A first header of the one or more first headers may be determined to match a header of the first list of headers based upon a determination that the first header comprises letters and/or one or more words that are also in the header of the first list of headers.

Alternatively and/or additionally, it may be determined that the one or more first sections are associated with the first sentiment category using one or more natural language processing (NLP) techniques and/or one or more text analysis techniques. For example, the first informational article may be analyzed using the one or more NLP techniques and/or the one or more text analysis techniques to identify the one or more first sections associated with the first sentiment category.

In some examples, the one or more first references may be determined to be associated with the first sentiment category based upon the one or more first references being indicated within the one or more first sections (determined to be associated with the first sentiment category). For example, the one or more first references may be associated with one or more first reference numbers (e.g., [1], [2], etc.). For example, each reference number of the one or more first reference numbers may be comprised within the one or more first sections. Alternatively and/or additionally, the one or more first references may be comprised within (e.g., listed within) a references section of the first informational article. For example, each reference of the one or more first references may be preceded by (and/or adjacent to) a reference number of the one or more first reference numbers. For example, responsive to identifying the one or more first reference numbers within the one or more first sections (associated with the first sentiment category), the references section may be analyzed based upon the one or more first reference numbers to identify the one or more first references.

Alternatively and/or additionally, each reference of the one or more first references may be indicative of a reference content item associated with the reference. For example, a reference of the one or more first references may comprise one or more of a title of a reference content item, a web address (e.g., a uniform resource locator) associated with the reference content item (e.g., the reference content item may be accessed via the web address), an author and/or a publisher associated with the reference content item, a time and/or a date that the reference content item was published, a time and/or a date that the reference content item was retrieved and/or included in the first informational article, etc.

In some examples, each reference content item of one or more first reference content items associated with the one or more first references may be accessed, extracted and/or downloaded. For example, a first reference of the one or more first references may comprise a first web address of a first reference content item. A first web page associated with the first reference content item may be accessed via the first web address and/or the first reference content item may be accessed, extracted and/or downloaded via the first web page (from a server associated with the first web page).

At 406, one or more first sentiment tags, indicative of the first sentiment category, may be assigned to the one or more first reference content items associated with the one or more first references (associated with the first sentiment category). For example, the one or more first sentiment tags may (each) correspond to a first value (e.g., −1 and/or a different value) associated with the first sentiment category.

In some examples, one or more second sections, within the first informational article, associated with the second sentiment category may be identified. Each section of the one or more second sections may comprise one or more words, one or more sentences and/or one or more paragraphs. In some examples, it may be determined that the one or more second sections are associated with the second sentiment category based upon a determination that one or more second headers associated with the one or more second sections are associated with the second sentiment category. Alternatively and/or additionally, it may be determined that the one or more second sections are associated with the second sentiment category using the one or more NLP techniques and/or the one or more text analysis techniques.

Alternatively and/or additionally, the one or more second sections may be determined to be associated with the second sentiment category based upon the one or more first sections associated with the first sentiment category. For example, responsive to determining that the one or more first sections of a plurality of sections of the first informational article are associated with the first sentiment category, it may be determined that remaining sections of the plurality of sections, that are not the one or more first sections, are associated with the second sentiment category (where the remaining sections may be the one or more second sections).

Alternatively and/or additionally, the one or more second references may be determined to be associated with the second sentiment category based upon the one or more second references being indicated within the one or more second sections (determined to be associated with the second sentiment category). Alternatively and/or additionally, the one or more second references may be determined to be associated with the second sentiment category based upon the one or more first references and/or a plurality of references of the first informational article. For example, responsive to determining that the one or more first references of the plurality of references (of the first informational article) are associated with the first sentiment category, it may be determined that remaining references of the plurality of references, that are not the one or more first references, are associated with the second sentiment category (where the remaining references may be the one or more second references).

In some examples, each reference content item of one or more second reference content items associated with the one or more second references may be extracted and/or downloaded. For example, a second reference of the one or more second references may comprise a second web address of a second reference content item. A second web page associated with the second reference content item may be accessed via the second web address and/or the second reference content item may be extracted and/or downloaded via the second web page (from a server associated with the second web page).

At 408, one or more second sentiment tags, indicative of the second sentiment category, may be assigned to the one or more second reference content items associated with the one or more second references (associated with the second sentiment category). For example, the one or more second sentiment tags may (each) correspond to a second value (e.g., 1 and/or a different value) associated with the second sentiment category.

At 410, the plurality of content items associated with the first entity may be identified. In some examples, the user profile database (and/or content items indicated by the user profile database) may be analyzed based upon the first entity to identify the plurality of content items associated with the first entity. For example, the user profile database (and/or content items indicated by the user profile database) may be analyzed based upon the name of the first entity to identify the plurality of content items (e.g., each content item of the plurality of content items may comprise the name of the first entity within one or more of a title, a summary, an article, etc.).

Alternatively and/or additionally, a content database associated with the content system may be analyzed based upon the first entity to identify the plurality of content items associated with the first entity. For example, content items of the content database may be analyzed based upon the name of the first entity to identify the plurality of content items (e.g., each content item of the plurality of content items may comprise the name of the first entity within one or more of a title, a summary, an article, etc.).

At 412, for each content item of the plurality of content items, a content item sentiment category associated with the content item may be determined based upon a comparison of the content item with the one or more first reference content items and the one or more second reference content items and/or a sentiment tag, corresponding to the content item sentiment category, may be assigned to the content item.

In some examples, the one or more first reference content items, the one or more second reference content items and/or the plurality of content items may comprise one or more content items corresponding to one or more video files and/or one or more audio files. One or more transcriptions may be generated based upon the one or more video files and/or the one or more audio files using one or more transcription techniques. Alternatively and/or additionally, the one or more transcriptions may be retrieved from a transcription database comprising transcriptions of the one or more video files and/or the one or more audio files.

In some examples, one or more first vector representations may be generated based upon the one or more first reference content items associated with the first sentiment category (and/or one or more transcriptions associated with the one or more first reference content items). Each vector representation of the one or more first vector representations may correspond to a content item of the one or more first reference content items. Alternatively and/or additionally, each vector representation of the one or more first vector representations may be indicative of the first sentiment category. In some examples, the one or more first vector representations may comprise one or more doc2vec embeddings generated based upon the one or more first reference content items using one or more doc2vec techniques and/or one or more machine learning techniques. In some examples, each doc2vec embedding of the one or more doc2vec embeddings may be a numerical representation (e.g., one or more of a numerical vector, a numerical embedding, etc.) of a collection of words of one or more of a document, an article, a transcription, etc. corresponding to a content item of the one or more first reference content items. It may be appreciated that doc2vec is an exemplary algorithm configured to receive as input a document, an article, a transcription, etc. and generate vectors and/or numerical representations. While doc2vec may be mentioned herein, one or more other algorithms similarly configured to receive as input a document, an article, a transcription etc. and generate vectors and/or numerical representations may be used instead (and/or in addition), and are contemplated.

Alternatively and/or additionally, first processing (e.g., text processing) may be performed on the one or more first reference content items (and/or one or more transcriptions associated with the one or more first reference content items) to generate a first modified set of reference content items. For example, the first processing may comprise performing one or more text modifications on the one or more first reference content items, such as removing symbols (e.g., punctuation symbols such as period marks, commas, quotation marks, etc., and/or other symbols) to generate the first modified set of reference content items. Alternatively and/or additionally, the first processing may comprise analyzing the one or more first reference content items (using one or more language detection techniques) to identify one or more content items of the one or more first reference content items that are associated with an undesired language (e.g., English, French, etc.) and/or generating the first modified set of reference content items without the one or more content items. In some examples, the one or more first vector representations may be generated based upon the first modified set of reference content items.

In some examples, one or more second vector representations may be generated based upon the one or more second reference content items associated with the second sentiment category (and/or one or more transcriptions associated with the one or more second reference content items). Each vector representation of the one or more second vector representations may correspond to a content item of the one or more second reference content items. Alternatively and/or additionally, each vector representation of the one or more second vector representations may be indicative of the second sentiment category. In some examples, the one or more second vector representations may comprise one or more doc2vec embeddings generated based upon the one or more second reference content items one or more doc2vec techniques and/or one or more machine learning techniques.

Alternatively and/or additionally, second processing (e.g., text processing) may be performed on the one or more second reference content items (and/or one or more transcriptions associated with the one or more second reference content items) to generate a second modified set of reference content items. In some examples, the one or more second vector representations may be generated based upon the second modified set of reference content items.

In some examples, a plurality of vector representations may be generated based upon the plurality of content items (and/or one or more transcriptions associated with the plurality of content items). Each vector representation of the plurality of vector representations may correspond to a content item of the plurality of content items. In some examples, the plurality of vector representations may comprise a plurality of doc2vec embeddings generated based upon the plurality of content items using one or more doc2vec techniques and/or one or more machine learning techniques.

Alternatively and/or additionally, third processing (e.g., text processing) may be performed on the plurality of content items (and/or one or more transcriptions associated with the plurality of content items) to generate a modified plurality of content items. In some examples, the plurality of vector representations may be generated based upon the modified plurality of content items.

In some examples, a content item sentiment category associated with a content item of the plurality of content items may be determined by comparing a vector representation corresponding to the content item with the one or more first vector representations and/or the one or more second vector representations to determine a plurality of similarities. For example, each similarity of the plurality of similarities may correspond to a similarity between the vector representation and a second vector representation of the one or more first vector representations or the one or more second vector representations. The content item sentiment category may be determined based upon the one or more first vector representations, the one or more second vector representations and/or the plurality of similarities.

Figure 5:
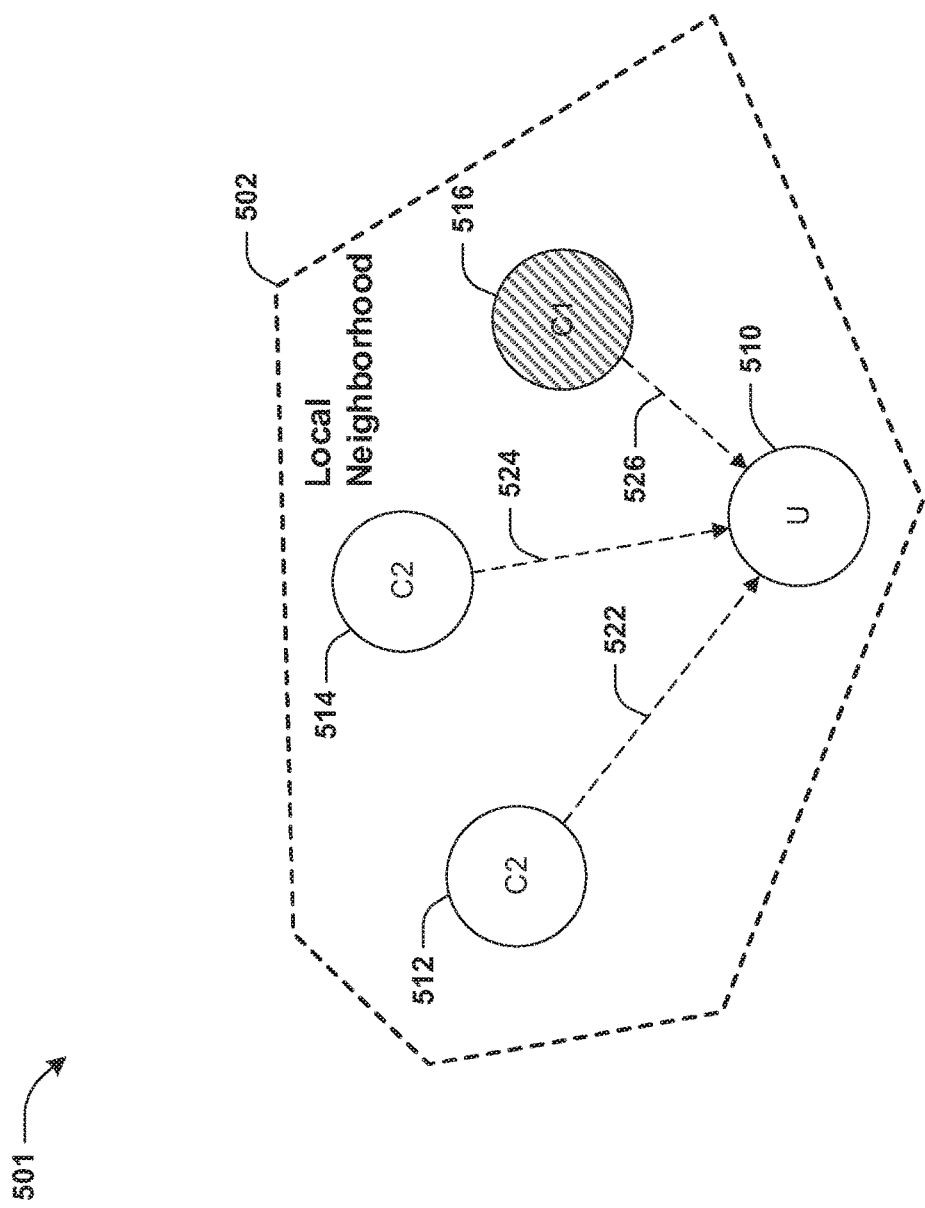
FIG. 5 is a diagram illustrating an exemplary system for determining an exemplary content item sentiment category associated with an exemplary content item.

FIG. 5 illustrates an exemplary system 501 for determining an exemplary content item sentiment category associated with an exemplary content item of the plurality of content items. A first exemplary vector representation 510 may be a vector representation (of the plurality of vector representations) corresponding to the exemplary content item. For example, the exemplary content item sentiment category associated with the exemplary content item may be unknown (labeled as "U" in FIG. 5).

In some examples, the one or more second vector representations may comprise a second exemplary vector representation 512 and/or a third exemplary vector representation 514 (labeled as "C2" in FIG. 5, corresponding to the second sentiment category). Alternatively and/or additionally, the one or more first vector representations may comprise a fourth exemplary vector representation 516 (labeled as "C1" in FIG. 5, corresponding to the first sentiment category).

In some examples, a first similarity 522 between the first exemplary vector representation 510 and the second exemplary vector representation 512 may be determined by performing one or more operations (e.g., mathematical operations) using the first exemplary vector representation 510 and/or the second exemplary vector representation 512. For example, the first similarity 522 may be a cosine similarity value (and/or one or more of a distance, a difference, etc. between the first exemplary vector representation 510 and the second exemplary vector representation 512).

Alternatively and/or additionally, a second similarity 524 between the first exemplary vector representation 510 and the third exemplary vector representation 514 may be determined by performing one or more operations (e.g., mathematical operations) using the first exemplary vector representation 510 and/or the third exemplary vector representation 514. For example, the second similarity 524 may be a cosine similarity value (and/or one or more of a distance, a difference, etc. between the first exemplary vector representation 510 and the third exemplary vector representation 514).

Alternatively and/or additionally, a third similarity 526 between the first exemplary vector representation 510 and the fourth exemplary vector representation 516 may be determined by performing one or more operations (e.g., mathematical operations) using the first exemplary vector representation 510 and/or the fourth exemplary vector representation 516. For example, the third similarity 526 may be a cosine similarity value (and/or one or more of a distance, a difference, etc. between the first exemplary vector representation 510 and the fourth exemplary vector representation 516).

In some examples, the second exemplary vector representation 512, the third exemplary vector representation 514 and/or the fourth exemplary vector representation 516 may be selected for comparison with the first exemplary vector representation 510 based upon a determination that the second exemplary vector representation 512, the third exemplary vector representation 514 and/or the fourth exemplary vector representation 516 are the three most similar vector representations of the one or more first vector representations and the one or more second vector representations to the first exemplary vector representation 510.

For example, the plurality of similarities associated with the one or more first vector representations and the one or more second vector representations may be ranked (and/or ordered) based upon a value and/or magnitude of each similarity of the plurality of similarities. For example, the plurality of similarities may be ranked from high values to low values and/or from low values to high values. For example, a defined quantity of vector representations of the one or more first vector representations and the one or more second vector representations may be selected from the one or more first vector representations and the one or more second vector representations for comparison with the first exemplary vector representation 510 based upon rankings (and/or similarities) associated with the one or more first vector representations and the one or more second vector representations. For example, if the defined quantity of vector representations is 1, merely a (single) highest ranked vector representation and/or most similar vector representation may be selected from the one or more first vector representations and the one or more second vector representations. Alternatively and/or additionally, if the defined quantity of vector representations is 2, two highest ranked vector representations (and/or two most similar vector representations) may be selected from the one or more first vector representations and the one or more second vector representations. In some examples, the defined quantity of vector representations may be generated based upon a first quantity of vector representations of the one or more first vector representations and/or a second quantity of vector representations of the one or more second vector representations.

In some examples, sentiment category values associated with the second exemplary vector representation 512, the third exemplary vector representation 514 and/or the fourth exemplary vector representation 516 may be combined to determine the exemplary content item sentiment category. For example, the sentiment category values associated with the second exemplary vector representation 512, the third exemplary vector representation 514 and/or the fourth exemplary vector representation 516 may be combined by performing one or more operations (e.g., mathematical operations) based upon the first similarity 522, the second similarity 524 and/or the third similarity 526.

In some examples, a first sentiment category value of the second exemplary vector representation 512 may be equal to 1 (and/or a different value associated with the first sentiment category). Alternatively and/or additionally, a second sentiment category value of the third exemplary vector representation 514 may be equal to 1 (and/or a different value associated with the first sentiment category). Alternatively and/or additionally, a third sentiment category value of the fourth exemplary vector representation 516 may be equal to −1 (and/or a different value associated with the second sentiment category).

In some examples, the exemplary content item sentiment category may be determined by combining (e.g., adding and/or a different mathematical operation) the first sentiment category value, the second sentiment category value and/or the third sentiment category value (e.g., 1+1+−1=1). For example, the exemplary content item sentiment category may be determined to correspond to the second sentiment category.

Alternatively and/or additionally, weights may be applied to the sentiment category values to generate weighted sentiment category values associated with the second exemplary vector representation 512, the third exemplary vector representation 514 and/or the fourth exemplary vector representation 516. For example, a first weight may be applied to the first sentiment category value of the second exemplary vector representation 512 to generate a first weighted sentiment category value (e.g., the first weighted sentiment category value may be equal to the first weight multiplied by the first sentiment category value). In some examples, the first weight may be generated based upon the first similarity 522 (and/or the first weight may be equal to the first similarity 522).

Alternatively and/or additionally, a second weight may be applied to the second sentiment category value of the third exemplary vector representation 514 to generate a second weighted sentiment category value (e.g., the second weighted sentiment category value may be equal to the second weight multiplied by the second sentiment category value). In some examples, the second weight may be generated based upon the second similarity 524 (and/or the second weight may be equal to the second similarity 524).

Alternatively and/or additionally, a third weight may be applied to the third sentiment category value of the fourth exemplary vector representation 516 to generate a third weighted sentiment category value (e.g., the third weighted sentiment category value may be equal to the third weight multiplied by the third sentiment category value). In some examples, the third weight may be generated based upon the third similarity 526 (and/or the third weight may be equal to the third similarity 526).

In some examples, the exemplary content item sentiment category may be determined by combining (e.g., adding and/or a different mathematical operation) the first weighted sentiment category value, the second weighted sentiment category value and/or the third weighted sentiment category value to generate an exemplary content item sentiment value. In some examples, the exemplary content item sentiment category may be determined to correspond to the first sentiment category if the exemplary content item sentiment value is closer to the first value (e.g., −1) associated with the first sentiment category than to the second value (e.g., 1) associated with the second sentiment category (e.g., if the exemplary content item sentiment value is equal to less than 0, the exemplary content item sentiment category may be determined to correspond to the first sentiment category). Alternatively and/or additionally, the exemplary content item sentiment category may be determined to correspond to the second sentiment category if the exemplary content item sentiment value is closer to the second value (e.g., 1) associated with the second sentiment category than to the first value (e.g., −1) associated with the first sentiment category (e.g., if the exemplary content item sentiment value is equal to greater than 0, the exemplary content item sentiment category may be determined to correspond to the second sentiment category).

Alternatively and/or additionally, the exemplary content item sentiment category may be indicative of the exemplary content item sentiment value. For example, if the exemplary content item sentiment value is equal to about 0.64, then the exemplary content item sentiment category may be indicative of the exemplary content item sentiment value being 0.64. Alternatively and/or additionally, if the exemplary content item sentiment value is equal to about 0.64, then the exemplary content item sentiment category may be indicative of the exemplary content item sentiment value being within a range of values (e.g., 0.6 to 0.69). Alternatively and/or additionally, if a second exemplary content sentiment value (associated with a second exemplary content item of the plurality of content items) is (determined to be) equal to about 0.85, then a second exemplary content item sentiment category associated with the second exemplary content item may be indicative of the second exemplary content sentiment value being 0.85 and/or the second exemplary content sentiment value being within a second range of values (e.g., 0.8 to 0.89). For example, the second exemplary content item sentiment category may be indicative of the second exemplary content item having a greater intensity of positivity and/or a greater level of positivity towards (and/or about) the first entity than the exemplary content item.

In some examples, the exemplary system 501 may correspond to a local neighborhood 502, where the first exemplary vector representation 510 may be compared merely with one or more vector representations within the local neighborhood 502. The local neighborhood 502 may merely comprise vector representations corresponding to the plurality of content items associated with the first entity.

Figure 6:
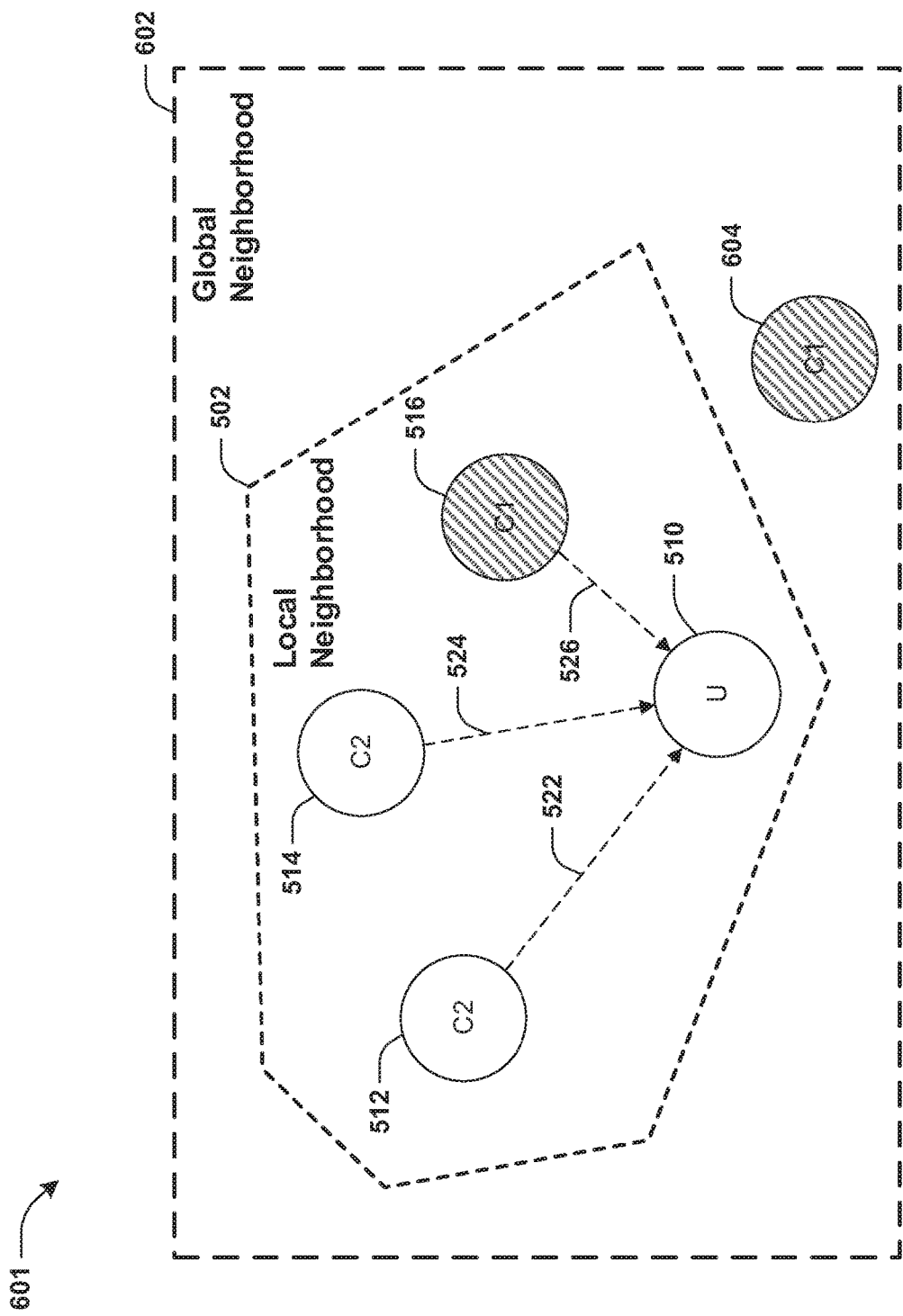
FIG. 6 is a diagram illustrating an exemplary system for determining an exemplary content item sentiment category associated with an exemplary content item.

FIG. 6 illustrates an exemplary system 601 for determining the exemplary content item sentiment category associated with the exemplary content item of the plurality of content items. The exemplary system 601 may correspond to a global neighborhood 602, where the first exemplary vector representation 510 may be compared within one or more vector representations within the global neighborhood 602. The global neighborhood 602 may comprise vector representations corresponding to content items associated with a plurality of entities comprising the first entity and/or one or more entities different than the first entity. For example, the local neighborhood 502 (and/or vector representations of associated with the first entity) may be included in the global neighborhood 602.

For example, rather than determining the exemplary content item sentiment category and/or the exemplary content item sentiment value associated with the first exemplary vector representation 510 based upon merely one or more vector representations associated with one or more reference content items associated with the first entity (e.g., the second exemplary vector representation 512, the third exemplary vector representation 514 and/or the fourth exemplary vector representation 516), the exemplary content item sentiment category and/or the exemplary content item sentiment value may be determined, using one or more of the described techniques of the present disclosure, based upon one or more vector representations associated with one or more content items associated with the one or more entities different than the first entity, such as a fifth exemplary vector representation 604 corresponding to a content item associated with a second entity.

In some examples, the exemplary content item sentiment category and/or the exemplary content item sentiment value associated with the first exemplary vector representation 510 may be determined based upon merely vector representations within the local neighborhood 502 (associated with the first entity) responsive to a quantity of vector representations of the one or more first vector representations and/or the one or more second vector representations being higher than a threshold quantity of vector representations (e.g., a quantity of a sum of the one or more first vector representations and the one or more second vector representations being higher than the threshold quantity of vector representations). Alternatively and/or additionally, the exemplary content item sentiment category and/or the exemplary content item sentiment value associated with the first exemplary vector representation 510 may be determined based upon vector representations within the global neighborhood 602 (associated with the first entity and/or the one or more entities) responsive to the quantity of vector representations being lower than the threshold quantity of vector representations.

In some examples, the first entity and the one or more entities associated with the global neighborhood 602 may have one or more common attributes. For example, the one or more entities and/or the first entity may be associated with a single entity category. The single entity category may be internet shopping (e.g., each of the one or more entities and/or the first entity may be an internet shopping company), ride-sharing (e.g., each of the one or more entities and/or the first entity may be a ride-share company), department store (e.g., each of the one or more entities and/or the first entity may be a department store company), fast-food (e.g., each of the one or more entities and/or the first entity may be a fast-food chain), car manufacturer (e.g., each of the one or more entities and/or the first entity may be a car brand), etc.

In some examples, the single entity category may be associated with a plurality of entities. In some examples, the one or more entities may be selected from the plurality of entities for inclusion of vector representations associated with the one or more entities in the global neighborhood 602 based upon one or more of a similarity of each entity of the plurality of entities with the first entity, a quantity of vector representations and/or a quantity of references available for each entity of the plurality of entities, etc.

In some examples, a plurality of content item sentiment values may be generated and/or a plurality of content item sentiment categories may be determined. Each content item sentiment value of the plurality of content item sentiment values may correspond to a content item of the plurality of content items. Alternatively and/or additionally, each content item sentiment category of the plurality of content item sentiment categories may correspond to a content item of the plurality of content items. In some examples, a sentiment tag, corresponding to a content item sentiment category of a content item of the plurality of content items may be assigned to the content item. For example, a plurality of sentiment tags may be assigned to the plurality of content items. Each sentiment tag of the plurality of sentiment tags may be indicative of a content item sentiment category of a content item of the plurality of content items.

In some examples, multiple iterations of generating the plurality of content item sentiment values and/or determining the plurality of content item sentiment categories may be performed using various sets of parameters. For example, multiple versions of the plurality of content item sentiment values may be generated and/or multiple versions of the plurality of content item sentiment categories may be determined. Each version of the multiple versions of the plurality of content item sentiment values may be generated using a set of parameters of multiple sets of parameters. For example, each set of parameters of the multiple sets of parameters may correspond to whether the plurality of content item sentiment values are generated based upon merely vector representations that are associated with the first entity (e.g., the local neighborhood 502), whether the plurality of content item sentiment values are generated based upon vector representations associated with the one or more entities, different than the first entity (e.g., the global neighborhood 504), a quantity of the defined quantity of vector representations, a quantity of the one or more entities, techniques used in generating the plurality of content item sentiment values, etc.

For example, a first version of the plurality of content item sentiment values may be generated based upon vector representations that are associated with the first entity and/or may not be generated based upon vector representations associated with the one or more entities different than the first entity (e.g., the first version of the plurality of content item sentiment values may be generated in association with the local neighborhood 502). Further, the first version of the plurality of content item sentiment values may be generated based upon the defined quantity of vector representations, where the defined quantity of vector representations is equal to a first quantity. In some examples, a first version of the plurality of content item sentiment categories may be determined based upon the first version of the plurality of content item sentiment values.

Alternatively and/or additionally, a second version of the plurality of content item sentiment values may be generated based upon vector representations that are associated with the first entity and/or may not be generated based upon vector representations associated with the one or more entities different than the first entity (e.g., the second version of the plurality of content item sentiment values may be generated in association with the local neighborhood 502). Further, the second version of the plurality of content item sentiment values may be generated based upon the defined quantity of vector representations, where the defined quantity of vector representations is equal to a second quantity, different than the first quantity. A second version of the plurality of content item categories may be determined based upon the second version of the plurality of content item sentiment values.

Alternatively and/or additionally, a third version of the plurality of content item sentiment values may be generated based upon vector representations that are associated with the first entity and/or may be generated based upon vector representations associated with the one or more entities different than the first entity (e.g., the third version of the plurality of content item sentiment values may be generated in association with the global neighborhood 602). Alternatively and/or additionally, when generating the third version of the plurality of content item sentiment values, a quantity of entities of the one or more entities may be equal to a third quantity (e.g., the third version of the plurality of content item sentiment values may be generated based upon vector representations corresponding to content items associated the one or more entities, where a quantity of the one or more entities is equal to the third quantity). A third version of the plurality of content item categories may be determined based upon the third version of the plurality of content item sentiment values.

Alternatively and/or additionally, a fourth version of the plurality of content item sentiment values may be generated based upon vector representations that are associated with the first entity and/or may be generated based upon vector representations associated with the one or more entities different than the first entity (e.g., the fourth version of the plurality of content item sentiment values may be generated in association with the global neighborhood 602). Alternatively and/or additionally, when generating the fourth version of the plurality of content item sentiment values, the quantity of entities of the one or more entities may be equal to a fourth quantity, different than the third quantity (e.g., the fourth version of the plurality of content item sentiment values may be generated based upon vector representations corresponding to content items associated the one or more entities, where a quantity of the one or more entities is equal to the fourth quantity). A fourth version of the plurality of content item categories may be determined based upon the fourth version of the plurality of content item sentiment values.

Alternatively and/or additionally, a fifth version of the plurality of content item sentiment categories may be determined using one or more label propagation techniques. For example, the fifth version of the plurality of content item sentiment categories may be determined based upon the plurality of vector representations, the one or more first vector representations and/or the one or more second vector representations. Alternatively and/or additionally, edge weights associated with pairs of vector representations may be defined (e.g., an edge weight between a pair of vector representations of the plurality of vector representations associated with the plurality of content items, the one or more first vector representations and/or the one or more second vector representations may be defined). The one or more label propagation techniques (and/or a label propagation algorithm) may be used to determine the fifth version of the plurality of content item sentiment categories based upon a manifold structure associated with the plurality of vector representations. Alternatively and/or additionally, one or more machine learning techniques (e.g., minimum spanning tree heuristic and/or entropy minimization techniques) may be used to determine (and/or learn) one or more parameters for performing the one or more label propagation techniques and/or determining the fifth version of the plurality of content item sentiment categories.

In some examples, a local mode of the one or more label propagation techniques may correspond to determining the fifth version of the plurality of content item sentiment categories based upon merely the plurality of vector representations, the one or more first vector representations and/or the one or more second vector representations. The fifth version of the plurality of content item sentiment categories may be determined using the local mode of the one or more label propagation techniques. Alternatively and/or additionally, a sixth version of the plurality of content item sentiment categories may be determined using a global mode of the one or more label propagation techniques. The global mode of the one or more label propagation techniques may correspond to determining the sixth version of the plurality of content item sentiment categories based upon the plurality of vector representations, the one or more first vector representations, the one or more second vector representations, a second plurality of vector representations corresponding to a second plurality of content items of the content database associated with the one or more entities different than the first entity, a third plurality of vector representations, associated with the first sentiment category, corresponding to reference content items associated with one or more informational articles associated with the one or more entities and/or a fourth plurality of vector representations, associated with the second sentiment category, corresponding to reference content items associated with the one or more informational articles associated with the one or more entities.

In some examples, each version of the plurality of content item sentiment categories may be compared with a set of known content item sentiment categories associated with a set of content items of the plurality of content items. For example, the set of known content item sentiment categories may be produced manually (e.g., one or more editors may view the set of content items and decide which content item sentiment category corresponds to each content item of the set of content items). Alternatively and/or additionally, the set of known content item sentiment categories may be generated automatically (e.g., the set of known content item sentiment categories may be generated using one or more machine learning techniques).

In some examples, a set of content item sentiment categories (associated with the set of content items) of each version of the plurality of content item sentiment categories, may be compared with the set of known content item sentiment categories to determine a precision and/or a performance associated with each version of the plurality of content item sentiment categories. For example, a version of the plurality of content item sentiment categories having a highest precision and/or a highest performance may be selected, where each tag of the plurality of sentiment tags assigned to the plurality of content items is indicative of a content item sentiment category of the version of the plurality of content item sentiment categories having the highest precision and/or the highest performance.

At 414, a request for content (e.g., a request for content 736 illustrated in FIG. 7D) associated with a first client device (e.g., a first client device 700 illustrated in FIG. 7A) may be received. In some examples, the request for content may be received from the first client device in association with a request to access a web page and/or a request to access one or more resources (e.g., one or more resources of an application (e.g., a mobile application)). Alternatively and/or additionally, the request for content may be received from a server associated with the web page and/or the one or more resources (as shown in FIGS. 7A-7D).

FIGS. 7A-7F illustrate an exemplary system 701 for selecting content for transmission to client devices. A first user, such as user Jennifer, and/or a first client device 700 (e.g., the first client device) associated with the first user may access and/or interact with a service, such as a browser, software, a website, an application, an operating system, an email interface, a messaging interface, a music-streaming application, a video application, etc. that provides a platform for viewing and/or downloading content from a server associated with the content system.

Figure 7A:
FIG. 7A is a diagram illustrating an exemplary system for selecting content for transmission to devices, where a first client device presents and/or accesses a first web page.

FIG. 7A illustrates the first client device 700 presenting and/or accessing a first web page 708 using a browser of the first client device 700. The browser may comprise an address bar 702 comprising a web address (e.g., a URL) of the first web page 708. The first web page 708 may comprise a search interface. For example, the search interface may comprise a web search engine designed to search for information throughout the internet. In some examples, the first web page 708 may comprise a search field 706. For example, a query "stock market" may be entered into the search field 706. In some examples, the first web page 708 may comprise a search selectable input 704 corresponding to performing a search based upon the query. For example, the search selectable input 704 may be selected.

Figure 7B:
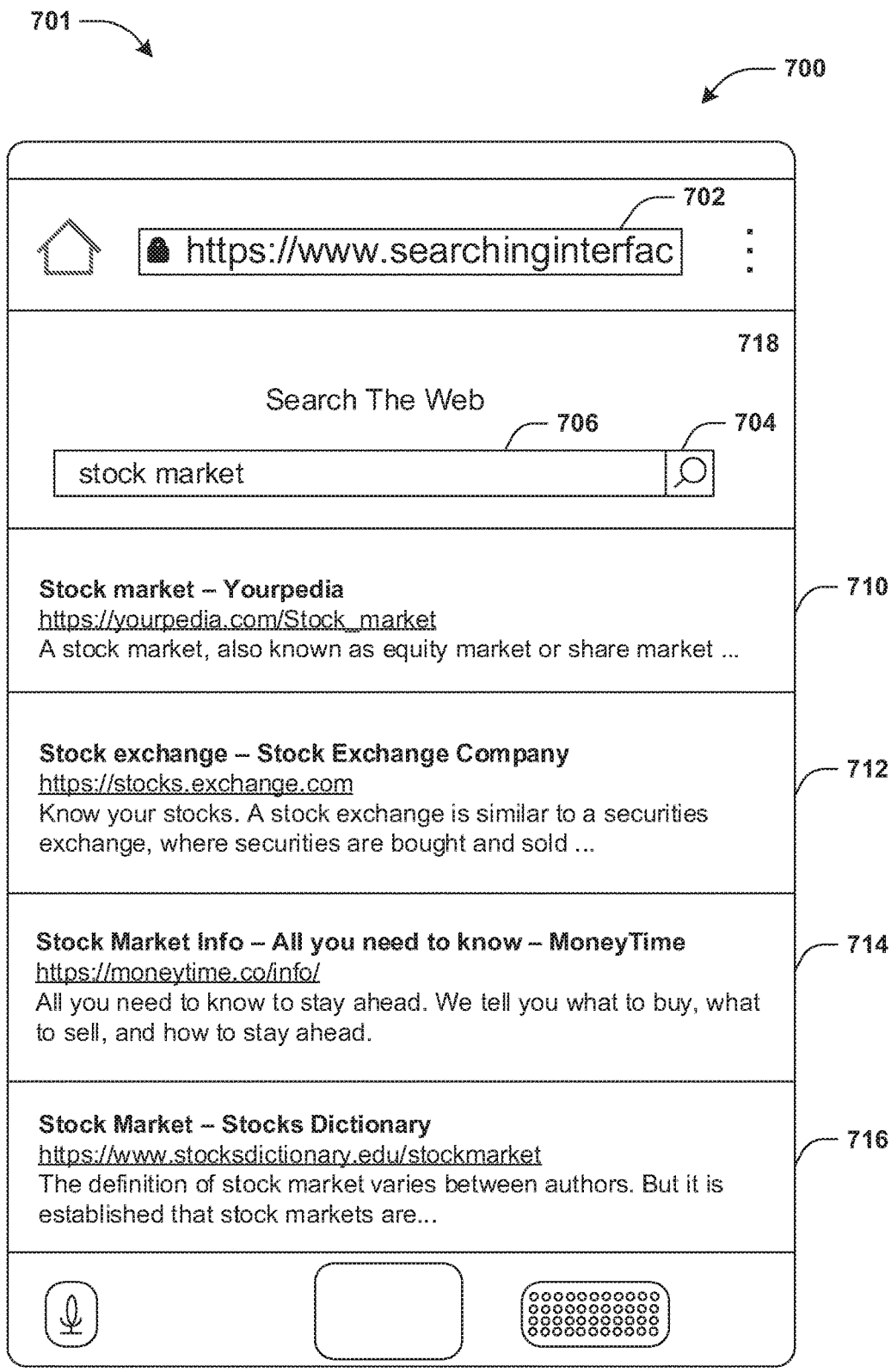
FIG. 7B is a diagram illustrating an exemplary system for selecting content for transmission to devices, where a first client device presents a plurality of search results associated with a query.

FIG. 7B illustrates the first client device 700 presenting a plurality of search results associated with the query using the browser of the first client device 700. For example, the plurality of search results may be presented within a second web page 718. For example, the plurality of search results may comprise a first search result 710 corresponding to a third web page, a second search result 712 corresponding to a fourth web page 720 (illustrated in FIG. 7F), a third search result 714 corresponding to a fifth web page and/or a fourth search result 716 corresponding to a sixth web page.

In some examples, each search result of the plurality of search results may comprise a selectable input (e.g., a link) corresponding to accessing a web page associated with the search result. In some examples, the second search result 712 corresponding to the fourth web page 720 may be selected (e.g., the second search result 712 may be selected via a second selectable input corresponding to the second search result 712).

Figure 7C:
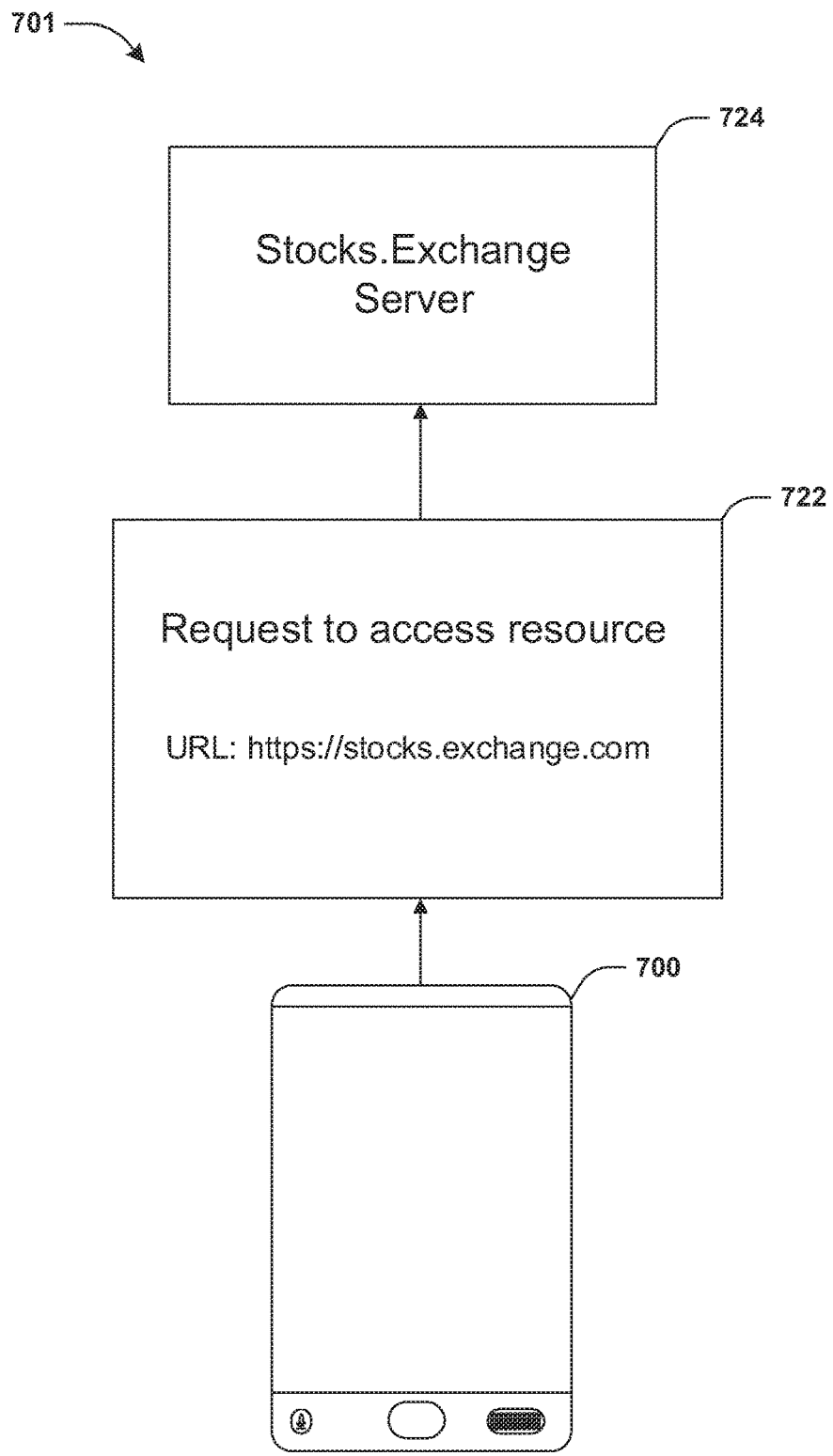
FIG. 7C is a diagram illustrating an exemplary system for selecting content for transmission to devices, where a first client device transmits a request to access a resource to a first server.

FIG. 7C illustrates the first client device 700 transmitting a request to access a resource 722 to a first server 724. In some examples, the request to access the resource 722 may be transmitted responsive to the second search result 712 being selected. For example, the resource may correspond to the fourth web page 720. For example, the request to access the resource 722 may comprise an indication of the fourth web page 720 (e.g., a web address "https://stocks.exchange-.com"). Alternatively and/or additionally, the first server 724 may be associated with the fourth web page 720.

Figure 7D:
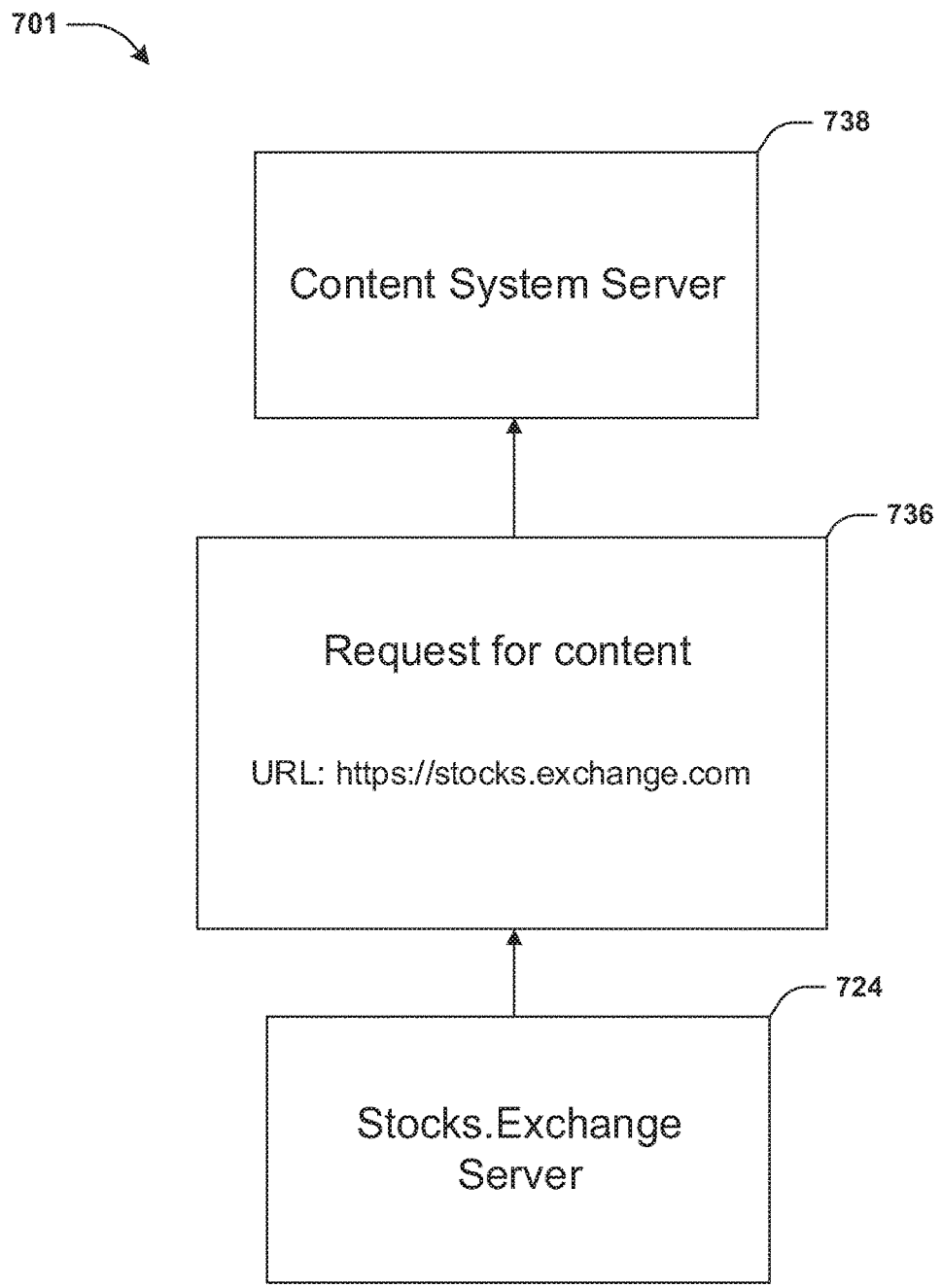
FIG. 7D is a diagram illustrating an exemplary system for selecting content for transmission to devices, where a first server transmits a request for content to a second server associated with a content system.

FIG. 7D illustrates the first server 724 transmitting a request for content 736 to a second server 738 associated with the content system. In some examples, the request for content 736 may be transmitted (by the first server 724) responsive to receiving the request to access the resource 722. Alternatively and/or additionally, the request for content 736 may be transmitted (to the second server 738) by the first client device 700. In some examples, the request for content 736 may be a request to be provided with a transmission content item (e.g., an advertisement, an image, a link, a video, etc.) (for presentation via the fourth web page 720).

Figure 7E:
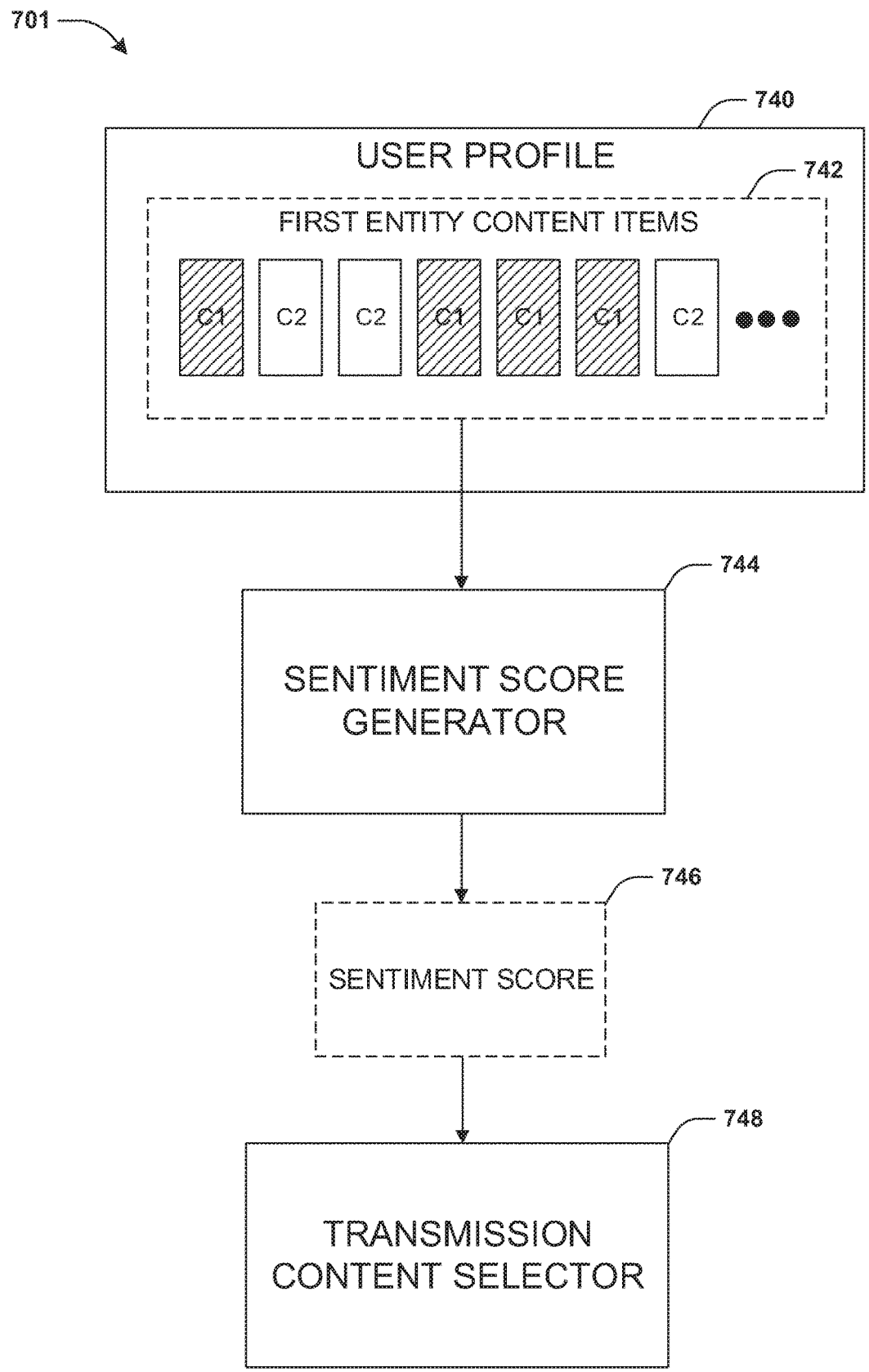
FIG. 7E is a diagram illustrating an exemplary system for selecting content for transmission to devices, where a transmission content item is selected for transmission to a first client device based upon a first user profile.

At 416, a first user profile (e.g., a first user profile 740 illustrated in FIG. 7E) associated with the first client device may be analyzed to identify one or more first content items (e.g., a set of first entity content items 742 illustrated in FIG. 7E) comprising one or more content items of the one or more first reference content items associated with the first sentiment category, one or more content items of the one or more second reference content items associated with the second sentiment category and/or one or more content items of the plurality of content items. The one or more first content items may comprise one or more content items that have been consumed, accessed, and/or selected in association with the first client device (e.g., by a user of the first client device, by one or more users similar to the user of the first client device, etc.).

FIG. 7E illustrates a transmission content item being selected for transmission to the first client device 700 based upon a first user profile 740. In some examples, the first user profile 740 may be indicative of a first set of first entity content items 742 associated with the first entity.

At 418, one or more sentiment tags associated with the one or more first content items (e.g., the first set of first entity content items) may be identified. For example, the first user profile (e.g., the first user profile 740) may be indicative of the one or more sentiment tags. Alternatively and/or additionally, a sentiment database may be analyzed based upon the one or more first content items (e.g., the first set of first entity content items) to identify (and/or determine) the one or more sentiment tags.

At 420, a user sentiment score (e.g., a user sentiment score 746 illustrated in FIG. 7E) may be generated based upon the one or more sentiment tags. For example, the user sentiment score 746 may be generated by a sentiment score generator 744. In some examples, the user sentiment score 746 may be generated by combining one or more sentiment values associated with the one or more sentiment tags (by performing one or more operations (e.g., mathematical operations) using the one or more sentiment tags 746).

In an example, the user sentiment score 746 may be generated by determining a sum of the one or more sentiment values associated with the one or more sentiment tags (e.g., by adding the one or more sentiment values together). For example, the user sentiment score 746 may be equal to the sum of the one or more sentiment values. Alternatively and/or additionally, the user sentiment score 746 may be equal to the sum of the one or more sentiment values, divided by a quantity of sentiment tags of the one or more sentiment tags.

At 422, a transmission content item may be selected for transmission to the first client device (e.g., the first client device 700) based upon the user sentiment score (e.g., the user sentiment score 746). For example, the transmission content item may be selected by a transmission content selector 748.

In some examples, the user sentiment score 746 being less than (and/or greater than) a defined user sentiment value (e.g., 0 and/or a different value) may be indicative of the first client device 700 accessing more content items expressing negative (and/or unfavorable) opinions, feelings, thoughts, facts, judgements and/or assessments about the first entity than content items expressing positive (e.g., favorable) (and/or neutral) opinions, feelings, thoughts, facts, judgements and/or assessments about the first entity, which may cause the first user to have negative opinions, feelings, thoughts, judgments and/or assessments towards the first entity.

Alternatively and/or additionally, the user sentiment score 746 being greater than (and/or less than) the defined user sentiment value may be indicative of the first client device 700 accessing more content items expressing positive (and/or favorable) opinions, feelings, thoughts, facts, judgements and/or assessments about the first entity than content items expressing negative (e.g., unfavorable) (and/or neutral) opinions, feelings, thoughts, facts, judgements and/or assessments about the first entity, which may cause the first user to have positive opinions, feelings, thoughts, judgments and/or assessments towards the first entity.

In some examples, responsive to the user sentiment score 746 being less than the defined user sentiment value, a content item associated with an entity different than the first entity may be selected as the transmission content item for transmission to the first client device 700. Alternatively and/or additionally, responsive to the user sentiment score 746 being less than the defined user sentiment value, a content item associated with the first entity may be selected as the transmission content item for transmission to the first client device 700. For example, the transmission content item may express positive (and/or favorable) opinions, feelings, thoughts, facts, judgements and/or assessments about the first entity, which may cause the first user to have positive opinions, feelings, thoughts, judgments and/or assessments towards the first entity. Alternatively and/or additionally, responsive to the user sentiment score 746 being greater than the defined user sentiment value, a content item associated with the first entity may be selected as the transmission content item for transmission to the first client device 700.

Alternatively and/or additionally, one or more user behaviors associated with one or more entity categories may be determined. For example, user activity of client devices may be monitored and/or analyzed based upon user sentiment scores, of the client devices, associated with a first entity category (e.g., internet shopping). A first behavior associated with the first entity category may be determined based upon the user activity and/or the user sentiment scores. The first behavior may be that client devices associated with user sentiment scores, less than the defined user sentiment value, that are associated with an exemplary entity of the first entity category, may be associated with a less than average rate of clicking on content items and/or conversions (e.g., purchasing a product, signing up for a service, etc.) associated with the exemplary entity and/or a less than average rate of clicking on content items and/or conversions associated with a second exemplary entity that is associated with the first entity category (e.g., an entity competing with the exemplary entity, such as a competing internet shopping company). Accordingly, responsive to a determination that the user sentiment score 746 is less than the defined user sentiment value and/or that the first entity is associated with the first entity category, a content item associated with an entity that is not associated with the first entity category may be selected as the transmission content item for transmission to the client device 700.

Alternatively and/or additionally, user activity of client devices may be monitored and/or analyzed based upon user sentiment scores, of the client devices, associated with a second entity category (e.g., internet shopping). A second behavior associated with the second entity category may be determined based upon the user activity and/or the user sentiment scores. The second behavior may be that client devices associated with user sentiment scores, greater than the defined user sentiment value, that are associated with an exemplary entity of the second entity category, may be associated with a greater than average rate of clicking on content items and/or conversions associated with the exemplary entity and/or a greater than average rate of clicking on content items and/or conversions associated with a third exemplary entity that is associated with the first entity category (e.g., an entity competing with the exemplary entity, such as a competing internet shopping company). Accordingly, responsive to a determination that the user sentiment score 746 is greater than the defined user sentiment value and/or that the first entity is associated with the second entity category, a content item associated with the first entity and/or a different entity associated with the second entity category may be selected as the transmission content item for transmission to the client device 700.

Alternatively and/or additionally, user activity of client devices may be monitored and/or analyzed based upon user sentiment scores, of the client devices, associated with a third entity category (e.g., ride sharing). A third behavior associated with the third entity category may be determined based upon the user activity and/or the user sentiment scores. The third behavior may be that client devices associated with user sentiment scores, less than the defined user sentiment value, that are associated with an exemplary entity of the third entity category, may be associated with a less than average rate of clicking on content items and/or conversions associated with the exemplary entity and/or a greater than average rate of clicking on content items and/or conversions associated with a fourth exemplary entity that is associated with the third entity category (e.g., an entity competing with the exemplary entity, such as a competing ride sharing company). Accordingly, responsive to a determination that the user sentiment score 746 is less than the defined user sentiment value and/or that the first entity is associated with the third entity category, a content item associated with an entity, different than the first entity, that is associated with the third entity category may be selected as the transmission content item for transmission to the client device 700.

Alternatively and/or additionally, user activity of client devices may be monitored and/or analyzed based upon user sentiment scores, of the client devices, associated with a fourth entity category (e.g., ride sharing). A fourth behavior associated with the fourth entity category may be determined based upon the user activity and/or the user sentiment scores. The fourth behavior may be that client devices associated with user sentiment scores, greater than the defined user sentiment value, that are associated with an exemplary entity of the fourth entity category, may be associated with a greater than average rate of clicking on content items and/or conversions associated with the exemplary entity and/or a less than average rate of clicking on content items and/or conversions associated with a fifth exemplary entity that is associated with the fourth entity category (e.g., an entity competing with the exemplary entity, such as a competing ride sharing company). Accordingly, responsive to a determination that the user sentiment score 746 is greater than the defined user sentiment value and/or that the first entity is associated with the fourth entity category, a content item associated with the first entity may be selected as the transmission content item for transmission to the client device 700.

Figure 7F:
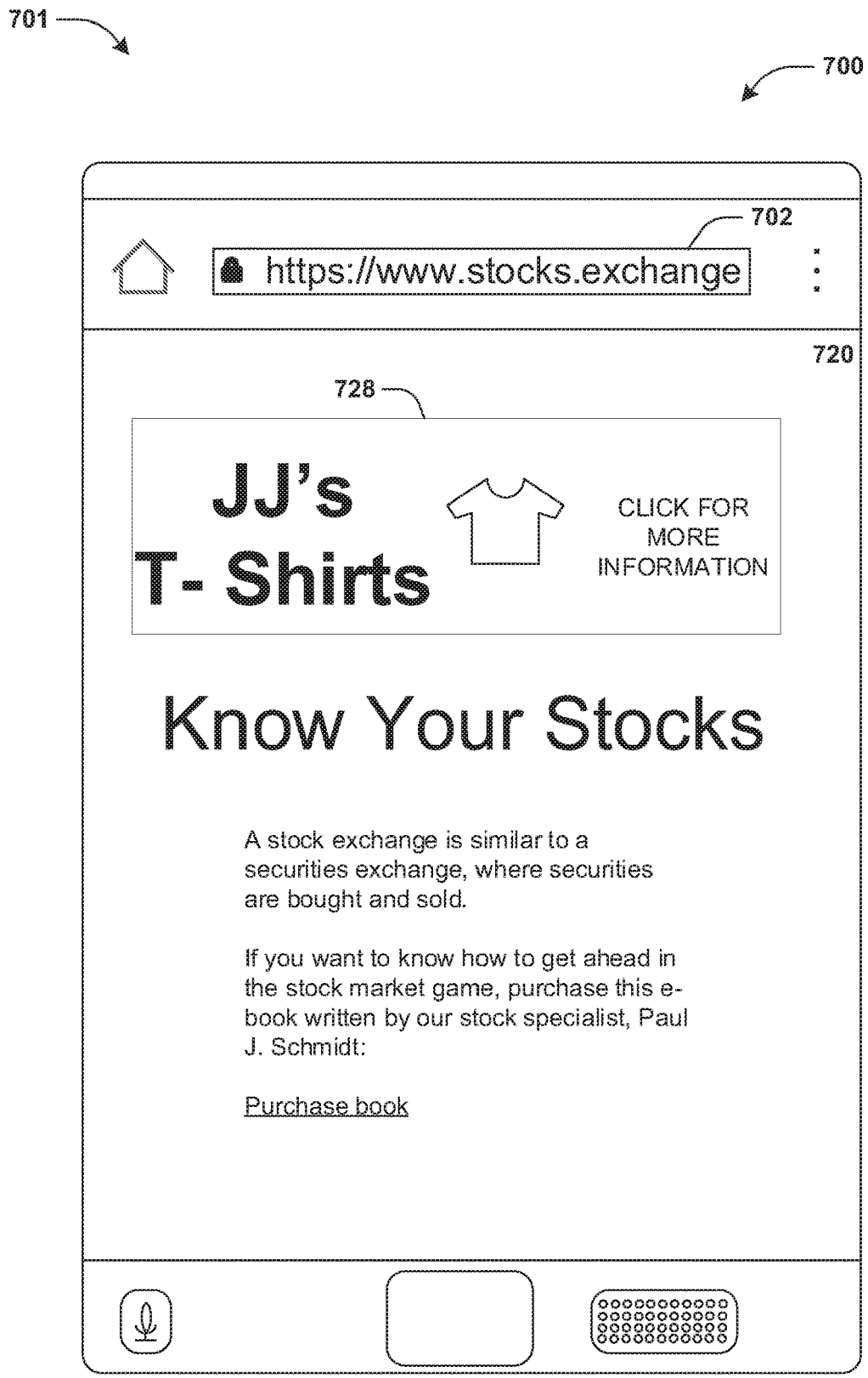
FIG. 7F is a diagram illustrating an exemplary system for selecting content for transmission to devices, where a first client device presents and/or accesses a fourth web page.

In some examples, the transmission content item may be transmitted to the first client device 700. FIG. 7F illustrates the first client device 700 presenting and/or accessing the fourth web page 720 using the browser of the first client device 700. For example, the content system may provide a content item 728 (e.g., the transmission content item) to be presented via the fourth web page 720 while the fourth web page 720 is accessed by the first client device 700.

It may be appreciated that the disclosed subject matter may assist a user (and/or a client device associated with the user) in viewing and/or consuming content associated with subject matter that the user has an interest in and/or in viewing and/or consuming content associated with an entity that the user has positive opinions, feelings, thoughts, judgments and/or assessments towards. Alternatively and/or additionally, the disclosed subject matter may assist an entity (e.g., a company, a brand, etc.) by transmitting content items to client devices that are selected based upon user sentiment scores associated with the entity.

Implementation of at least some of the disclosed subject matter may lead to benefits including, but not limited to, a reduction in screen space and/or an improved usability of a display (e.g., of the client device) (e.g., as a result of enabling the user to automatically consume content associated with subject matter that the user has an interest in, as a result of enabling the user to automatically consume content associated with an entity that the user has positive opinions, feelings, thoughts, judgments and/or assessments towards, wherein the user may not view content that the user does not have an interest in, wherein the user may not need to open a separate application and/or a separate window in order to find content, etc.).

Alternatively and/or additionally, implementation of at least some of the disclosed subject matter may lead to benefits including a reduction in bandwidth (e.g., as a result of reducing a need for the user to search throughout the internet and/or navigate through internet content to find interesting content).

Alternatively and/or additionally, implementation of at least some of the disclosed subject matter may lead to benefits including more accurate and precise transmission of content to intended users (e.g., as a result of automatically determining user sentiment scores associated with users, as a result of transmitting content to each user based upon the user sentiment scores, etc.).

Alternatively and/or additionally, implementation of at least some of the disclosed subject matter may lead to benefits including less manual effort (e.g., as a result of analyzing the informational database to identify sentiment categories associated with reference content items automatically, wherein editor inputted training data is not required because of automatic identification of one or more first reference content items associated with a first sentiment category and/or automatic identification of one or more second reference content items associated with a second sentiment category, as a result of determining sentiment categories associated with other content items automatically based upon the one or more first reference content items and/or the one or more second reference content items, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 8:
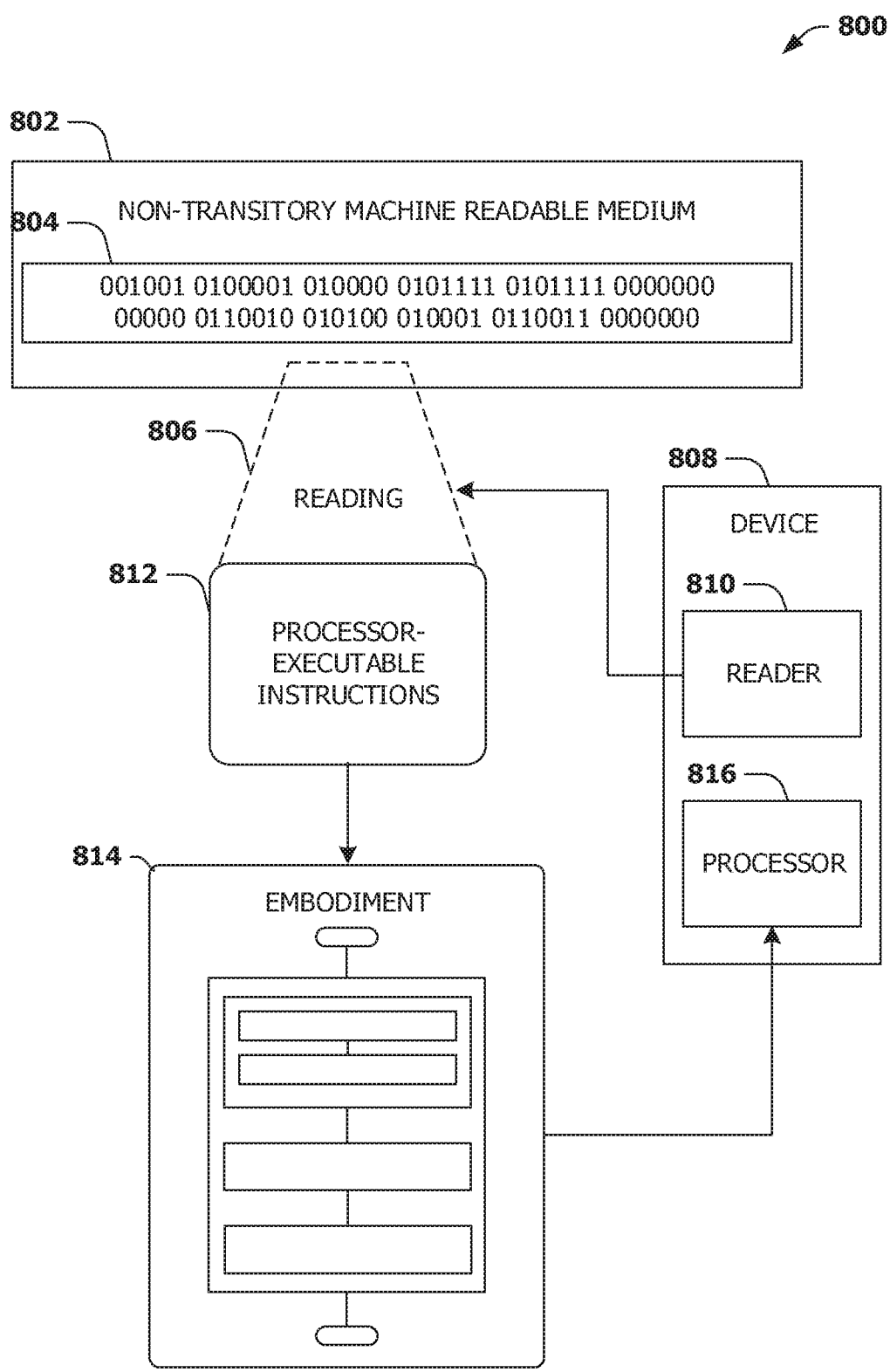
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIGS. 4A-4B, for example. In some embodiments, the processor-executable instructions 812 are configured to cause implementation of a system, such as at least some of the exemplary system 501 of FIG. 5, at least some of the exemplary system 601 of FIG. 6, and/or at least some of the exemplary system 701 of FIGS. 7A-7F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
analyzing an informational database based upon a first entity to identify a first informational article associated with the first entity from a plurality of informational articles of the informational database;
analyzing the first informational article to identify:
one or more first references associated with a first sentiment category; and
one or more second references associated with a second sentiment category;
assigning one or more first sentiment tags, indicative of the first sentiment category, to one or more first reference content items associated with the one or more first references;
assigning one or more second sentiment tags, indicative of the second sentiment category, to one or more second reference content items associated with the one or more second references;
identifying a plurality of content items associated with the first entity;
for each content item of the plurality of content items:
determining a content item sentiment category associated with the content item based upon a comparison of the content item with the one or more first reference content items and the one or more second reference content items; and
assigning a sentiment tag, corresponding to the content item sentiment category, to the content item;
receiving a request for content associated with a client device;
analyzing a user profile associated with the client device to identify one or more first content items comprising at least one of:
one or more content items of the one or more first reference content items associated with the first sentiment category;
one or more content items of the one or more second reference content items associated with the second sentiment category; or
one or more content items of the plurality of content items;
identifying one or more sentiment tags associated with the one or more first content items;
generating, based upon the one or more sentiment tags, a user sentiment score associated with the first entity; and
selecting a transmission content item for transmission to the client device based upon the user sentiment score.

2. The method of claim 1, wherein:
the informational database is associated with a web encyclopedia; and
each informational article of the plurality of informational articles corresponds to an entry of the web encyclopedia.

3. The method of claim 1, comprising:
generating, based upon the one or more first reference content items, one or more first vector representations, wherein each vector representation of the one or more first vector representations corresponds to a content item of the one or more first reference content items;
generating, based upon the one or more second reference content items, one or more second vector representations, wherein each vector representation of the one or more second vector representations corresponds to a content item of the one or more second reference content items; and
generating, based upon the plurality of content items, a plurality of vector representations, wherein each vector representation of the plurality of vector representations corresponds to a content item of the plurality of content items.

4. The method of claim 3, wherein for each content item of the plurality of content items:
the determining the content item sentiment category associated with the content item comprises comparing a vector representation corresponding to the content item with the one or more first vector representations and the one or more second vector representations to determine a plurality of similarities, wherein each similarity of the plurality of similarities corresponds to a similarity between the vector representation and a second vector representation of the one or more first vector representations or the one or more second vector representations; and
the content item sentiment category is determined based upon the one or more first vector representations, the one or more second vector representations and the plurality of similarities.

5. The method of claim 1, wherein for each content item of the plurality of content items:
the content item sentiment category is determined based upon a second comparison of the content item with one or more third reference content items associated with a second informational article associated with a second entity.

6. The method of claim 1, wherein the analyzing the first informational article to identify the one or more first references associated with the first sentiment category comprises:
identifying one or more sections, within the first informational article, associated with the first sentiment category;
identifying, within the one or more sections, indications of the one or more first references; and
determining, based upon the indications of the one or more first references being within the one or more sections associated with the first sentiment category, that the one or more first references are associated with the first sentiment category.

7. The method of claim 6, wherein the identifying the one or more sections is performed based upon a determination that one or more headers associated with the one or more sections are associated with the first sentiment category.

8. The method of claim 6, wherein the identifying the one or more sections is performed based upon a determination that each header of one or more headers associated with the one or more sections matches a header in a first list of headers associated with the first sentiment category.

9. The method of claim 1, comprising transmitting the transmission content item to the client device.

10. A computing device comprising:
a processor; and
memory comprising processor-executable instructions that when executed by the processor cause performance of operations, the operations comprising:

analyzing an informational database based upon a first entity to identify a first informational article associated with the first entity from a plurality of informational articles of the informational database;

analyzing the first informational article to identify:
one or more first references determined to be associated with a first sentiment category based upon one or more indications of the one or more first references being within a section, of the first informational article, associated with the first sentiment category;

assigning one or more first sentiment tags, indicative of the first sentiment category, to one or more first reference content items associated with the one or more first references;

identifying a plurality of content items associated with the first entity; and for each content item of the plurality of content items:
determining a content item sentiment category associated with the content item based upon a comparison of the content item with the one or more first reference content items; and assigning a sentiment tag, corresponding to the content item sentiment category, to the content item.

11. The computing device of claim 10, wherein:
the informational database is associated with a web encyclopedia; and
each informational article of the plurality of informational articles corresponds to an entry of the web encyclopedia.

12. The computing device of claim 10, the operations comprising:
generating, based upon the one or more first reference content items, one or more first vector representations, wherein each vector representation of the one or more first vector representations corresponds to a content item of the one or more first reference content items; and
generating, based upon the plurality of content items, a plurality of vector representations, wherein each vector representation of the plurality of vector representations corresponds to a content item of the plurality of content items.

13. The computing device of claim 12, for each content item of the plurality of content items:
the determining the content item sentiment category associated with the content item comprises comparing a vector representation corresponding to the content item with the one or more first vector representations to determine a plurality of similarities, wherein each similarity of the plurality of similarities corresponds to a similarity between the vector representation and a second vector representation of the one or more first vector representations; and
the content item sentiment category is determined based upon the one or more first vector representations and the plurality of similarities.

14. The computing device of claim 10, wherein for each content item of the plurality of content items:
the content item sentiment category is determined based upon a second comparison of the content item with one or more third reference content items associated with a second informational article associated with a second entity.

15. The computing device of claim 10, the operations comprising:
analyzing the first informational article to identify one or more second references associated with a second sentiment category; and
assigning one or more second sentiment tags, indicative of the second sentiment category, to one or more second reference content items associated with the one or more second references, wherein the content item sentiment category is based upon the one or more second reference content items.

16. The computing device of claim 10, the operations comprising identifying the sections based upon a determination that a header associated with the section is associated with the first sentiment category.

17. The computing device of claim 10, the operations comprising identifying the sections based upon a determination that a header associated with the section matches a listed header in a first list of headers associated with the first sentiment category.

18. A non-transitory machine readable medium having stored thereon processor-executable instructions that when executed cause performance of operations, the operations comprising:
receiving a request for content associated with a client device;
analyzing a user profile associated with the client device to identify one or more first content items associated with a first entity;
determining a first sentiment tag, indicative of a first sentiment category, for a first content item of the one or more first content items, wherein the first sentiment tag is determined for the first content item based upon an indication of a first reference associated with the first content item being within a section, of an article associated with the first entity, associated with the first sentiment category;
identifying one or more sentiment tags, comprising the first sentiment tag, associated with the one or more first content items and the first entity;
generating, based upon the one or more sentiment tags, a user sentiment score associated with the first entity; and
selecting a transmission content item for transmission to the client device based upon the user sentiment score.

19. The non-transitory machine readable medium of claim 18, the operations comprising transmitting the transmission content item to the client device.

20. The non-transitory machine readable medium of claim 18, wherein the request for content is received from the client device.

* * * * *